United States Patent
Jaramillo et al.

(10) Patent No.: US 12,229,071 B2
(45) Date of Patent: Feb. 18, 2025

(54) eUSB REPEATER FOR PASSING REPEATING MODE PACKETS BETWEEN A DIFFERENTIAL BUS AND A SINGLE-ENDED BUS

(71) Applicant: NXP USA, Inc., Austin, TX (US)

(72) Inventors: Kenneth Jaramillo, Gilbert, AZ (US); Bart Vertenten, Merelbeke (BE)

(73) Assignee: NXP USA, Inc., Austin, TX (US)

( * ) Notice: Subject to any disclaimer, the term of this patent is extended or adjusted under 35 U.S.C. 154(b) by 74 days.

(21) Appl. No.: 18/073,507

(22) Filed: Dec. 1, 2022

(65) Prior Publication Data

US 2024/0184730 A1    Jun. 6, 2024

(51) Int. Cl.
G06F 13/42    (2006.01)

(52) U.S. Cl.
CPC .................................... G06F 13/42 (2013.01)

(58) Field of Classification Search
CPC ......................................................... G06F 13/42
USPC ......................................................... 710/104
See application file for complete search history.

(56) References Cited

U.S. PATENT DOCUMENTS

| | | | | |
|---|---|---|---|---|
| 5,243,623 A * | 9/1993 | Murdock | ............ | G06F 13/4072 375/220 |
| 5,289,415 A * | 2/1994 | DiMarco | ............... | G11C 11/419 365/208 |
| 5,371,763 A * | 12/1994 | Ota | ...................... | H04B 10/695 375/345 |
| 5,414,310 A * | 5/1995 | Fattaruso | ............. | H03K 5/2481 327/63 |
| 5,466,944 A * | 11/1995 | Krause | ................. | H04B 10/802 250/214 R |
| 5,671,376 A * | 9/1997 | Bucher | ............... | G06F 13/4072 710/305 |
| 5,861,828 A * | 1/1999 | Opris | .................. | H03M 1/1057 341/161 |
| 6,119,183 A * | 9/2000 | Briel | .................... | G06F 13/4022 710/316 |
| 6,260,092 B1 | 7/2001 | Story et al. | | |
| 6,304,496 B1 * | 10/2001 | Tsukikawa | .......... | G11C 11/4093 365/189.16 |
| 6,700,970 B1 * | 3/2004 | Aronson | ........... | H04M 3/42314 379/225 |
| 6,731,139 B1 * | 5/2004 | Wert | ....................... | H03K 5/19 327/67 |

(Continued)

OTHER PUBLICATIONS

Embedded USB2 (eUSB2) Physical Layer Supplement yo the USB Revision 2.0 Specification Revision 1.1 (Year: 2018).*

(Continued)

*Primary Examiner* — Paul R. Myers

(57) ABSTRACT

An eUSB repeater is described for passing repeating mode packets between a differential bus and a single-ended bus. An eUSB transceiver is coupled to a single ended bus, a USB transceiver is coupled to a differential bus, and repeater logic is coupled to and between the eUSB transceiver and the USB transceiver. A first enable control circuit receives a digital state transition from the differential data bus and generates an enable signal to an analog single-ended transmitter of the eUSB transceiver. A second enable control circuit receives a digital state transition from the single-ended data bus and generates an enable signal to an analog differential transmitter of the USB transceiver.

23 Claims, 13 Drawing Sheets

(56) References Cited

U.S. PATENT DOCUMENTS

| | | | |
|---|---|---|---|
| 8,078,768 B2 | 12/2011 | Manor et al. | |
| 9,239,810 B2 | 1/2016 | Chen et al. | |
| 10,802,566 B1* | 10/2020 | Lam | G06F 1/3296 |
| 10,891,242 B2 | 1/2021 | Wente et al. | |
| 2002/0003436 A1* | 1/2002 | Andrews | H03K 19/1774 |
| | | | 326/40 |
| 2002/0087606 A1* | 7/2002 | Harness | H03H 17/02 |
| | | | 708/300 |
| 2002/0181402 A1* | 12/2002 | Lemoff | H04L 45/02 |
| | | | 709/241 |
| 2005/0246125 A1* | 11/2005 | Marsh | G01R 31/318544 |
| | | | 702/117 |
| 2007/0219748 A1 | 9/2007 | Iwasa | |
| 2008/0140907 A1* | 6/2008 | Dreps | G06F 13/1694 |
| | | | 711/E12.001 |
| 2008/0195792 A1* | 8/2008 | Teil | G06F 13/4072 |
| | | | 710/313 |
| 2009/0303883 A1* | 12/2009 | Kucharczyk | H04L 49/351 |
| | | | 370/241 |
| 2013/0111076 A1 | 5/2013 | Vaynberg et al. | |
| 2014/0006664 A1* | 1/2014 | Chen | G06F 13/4072 |
| | | | 710/106 |
| 2014/0006674 A1 | 1/2014 | Chan et al. | |
| 2014/0359176 A1* | 12/2014 | Kim | G06F 13/32 |
| | | | 710/59 |
| 2015/0227489 A1* | 8/2015 | Chen | G06F 13/385 |
| | | | 710/313 |
| 2015/0269112 A1* | 9/2015 | Hsueh | G06F 13/4072 |
| | | | 710/105 |
| 2016/0162427 A1* | 6/2016 | Kang | G06F 13/387 |
| | | | 710/313 |
| 2016/0269126 A1* | 9/2016 | Maung | H04B 10/29 |
| 2017/0181081 A1* | 6/2017 | Kim | H04B 1/0483 |
| 2018/0285308 A1* | 10/2018 | Liu | G06F 13/404 |
| 2019/0056873 A1* | 2/2019 | Zhu | G06F 3/0619 |
| 2022/0206556 A1* | 6/2022 | Erdogan | G06F 1/3278 |
| 2023/0155604 A1* | 5/2023 | Greenslade | H03F 1/56 |
| | | | 341/144 |

OTHER PUBLICATIONS

U.S. Appl. No. 18/073,510, filed Dec. 1, 2022, 48 pages.
Apple Inc. et al.; "Embedded USB2 (eUSB2) Physical Layer Supplement to the USB Revision 2.0 Specification"; Revision 1.2; 2018; 169 pgs.
U.S. Appl. No. 18/073,510 Notice of Allowance mailed Jun. 11, 2024, 16 pages.
U.S. Appl. No. 18/073,510 Notice of Allowance mailed Sep. 18, 2024, 8 pages.

* cited by examiner eUSB REPEATER FOR PASSING REPEATING MODE PACKETS BETWEEN A DIFFERENTIAL BUS AND A SINGLE-ENDED BUS

BACKGROUND

Universal Serial Bus (USB) has been an extreme success as a standard for short-range wired data communication in the electronics industry. USB use is ubiquitous for peripheral devices, accessories, and internal connections and it continues to be the ascendant serial interconnect for electronic devices. USB was originally developed as a universal bus to connect a computer to external peripheral devices and accessories, for example, printers, scanners, keyboards, microphones, and gaming controllers. As the speed of the bus increased and the cost of supporting chips decreased, more types of devices were added. A part of the extreme success is backwards compatibility that allows a keyboard, 25 years old, designed for a 1.5 Mbps interface to be attached to a new 10 Gbps socket connector using the keyboard's original USB Type A-plug connector. The older Low-Speed 1.5 Mbps, Full-Speed 12 Mbps, and High-Speed 480 Mbps modes are still supported in all USB connectors.

USB is also being used as a high-speed data interface within many computers and portable devices. For example, a built-in camera, touch sensor, keypad, microphone, memory, and other devices may all be connected internally using USB. To improve these internal connections, embedded USB 2.0 (eUSB2) allows systems with advanced technology nodes to operate with USB 2.0 in Low Speed mode, Full Speed mode, and Hight Speed modes similar to USB 2.0 at lower cost. eUSB2 allows data to be carried at less cost on printed circuit board traces, when desired and without the power supply connections of USB.

USB was originally established with 3.3V signaling for data and control. 3.3V was considered low voltage at the time and has been maintained for backwards compatibility, among other reasons. As silicon device geometries shrink, support for what are now higher voltages, for example 3.3V, is not possible in newer smaller device geometries. To allow advanced USB Hosts and Devices to use advanced silicon device geometries, the eUSB2 Specification defines a lower signaling voltage, for example, 1.0V, and then defines an eUSB2 repeater as an interface between the two voltages. The repeater converts the lower voltages of eUSB2, used within advanced USB Hosts and Devices, to the higher voltages of USB signaling between devices and vice versa. In addition, during Low-Speed and Full-Speed modes, the repeater also translates the protocol timing between the eUSB2 and USB busses.

To further eliminate unnecessary cost, eUSB2 uses single-ended signaling in Low Speed and Full Speed mode. Single-ended signaling uses one wire or conductor for the signal and relies on an available common reference voltage which is normally readily accessible within an embedded system on an integrated circuit (IC) and on a printed circuit board (PCB). USB uses differential signaling which uses two wires with opposite polarity to both send the same signal. Differential signaling is more reliable with external wired connectors. In these legacy modes, the eUSB2 repeater also converts differential signaling to single-ended signaling and vice versa.

SUMMARY

Embodiments of a method and a device are disclosed. In an embodiment a signal repeater that is configured to pass repeating mode packets between a differential bus and a single-ended bus is disclosed. In an embodiment, the device involves an analog differential receiver configured to receive a differential data signal from a differential data bus, having two lines, at a receiver output driver and configured to drive an internal data signal on an internal data line from the receiver output driver in response to the received differential data signal, an analog single-ended transmitter configured to receive the internal data signal from the internal data line at a transmitter output driver and configured to drive the single-ended data signal from the transmitter output driver on a single-ended data bus, and an enable control circuit configured to enable the analog single-ended transmitter using a data line enable signal, the enable control circuit receiving a digital state transition from the differential data bus and generating the data line enable signal in response thereto.

In an embodiment, the enable control circuit comprises a stable logic circuit configured to maintain the data line enable signal until receiving a reset signal. In an embodiment, the device includes an input filter circuit configured to receive the differential data signal, configured to detect an end of packet (EOP) signal at the input filter circuit, and configured to disable the data line enable signal at the enable control circuit in response to the EOP signal.

In an embodiment, the enable control circuit comprises a stable logic circuit configured to maintain the data line enable signal until receiving a reset signal and wherein the input filter circuit is coupled to a reset port of the stable logic circuit to provide the reset signal to the stable logic circuit. In an embodiment, the device includes switched pulldown resistors coupled to the input filter circuit and configured to be coupled to the singled-ended data line when the data line enable signal of the input filter circuit is disabled.

In an embodiment, the EOP signal comprises a state in which the differential data bus has a low state on both lines for more than a specific delay, wherein the input filter circuit comprises a logic gate with an output coupled to the enable control circuit, and wherein the logic gate disables the data line enable signal after receiving the EOP signal for more than the specific delay. In an embodiment, the EOP signal includes a single-ended zero (SE0) signal.

An embodiment of a method of passing repeating mode packets between a differential bus and a single-ended bus is disclosed. In an embodiment, the method involves receiving a differential data signal from a differential data bus, having two lines, driving an internal data signal on an internal data line in response to the received differential data signal, receiving the internal data signal from the internal data line, driving the single-ended data signal on a single ended data bus, and enabling driving the single-ended data signal on the single-ended data bus using a data line enable signal in response to a digital state transition from the differential data bus.

In an embodiment, the method includes detecting an EOP signal and disabling the data line enable signal in response to the EOP signal after a delay after an SE0 condition ends on the differential data signal. In an embodiment, the method includes delaying the single-ended data signal based on the delay after the SE0 condition ends.

An embodiment of a device that is configured to pass repeating mode packets between a differential bus and a single-ended bus is disclosed. In an embodiment, the device involves an analog single-ended receiver configured to receive a single-ended data signal from a single-ended data bus at a receiver output driver and configured to drive a internal data signal from the receiver output driver on a internal data line, an analog differential transmitter configured to receive the internal data signal from the internal data line, at a transmitter output driver and configured to drive a differential data signal on a differential data bus having two lines from the transmitter output driver in response to the received single-ended data signal, and an enable control circuit configured to enable the analog differential transmitter using a transmitter enable signal, the enable control circuit receiving a digital state transition from the single-ended data bus and generating the transmitter enable signal in response thereto.

In an embodiment, the enable control circuit comprises a stable logic circuit configured to maintain the data line enable signal until receiving a reset signal. In an embodiment, the device includes an enable gate coupled to the enable control circuit and to the transmitter output driver to provide the transmitter enable signal to the transmitter output driver, and an end of packet (EOP) start circuit coupled to the single-ended data bus configured to receive the single-ended data signal and configured to detect a start of an EOP signal at the EOP start circuit, the EOP start circuit being coupled to the enable gate and configured to maintain the transmitter enable signal to the transmitter output driver in response to the start of the EOP signal.

In an embodiment, the enable control circuit comprises a stable logic circuit configured to maintain the data line enable signal until receiving a reset signal and wherein the EOP start circuit is coupled to a reset port of the stable logic circuit configured to provide the reset signal to the stable logic circuit. In an embodiment, the EOP start circuit is coupled to the analog differential transmitter to send an EOP signal to cause the transmitter output driver to drive the two lines of the differential data bus low.

In an embodiment, the device includes an EOP end circuit configured to detect an end of an EOP signal at the EOP end circuit, the EOP end circuit being coupled to the enable control circuit and configured to disable the transmitter enable signal at the enable control circuit in response to the end of the EOP signal such that the transmitter output driver is disabled. In an embodiment, the transmitter output driver comprises a digital transistor output driver configured to convert the voltage of the differential data signal to a higher voltage for the differential data signal and having a first output and a second inverted output.

An embodiment of a method of passing repeating mode packets between a differential bus and a single-ended bus is disclosed. In an embodiment, the method involves receiving a single-ended data signal from a single-ended data bus, driving a single-ended data signal on a single ended data line, receiving the internal data signal from the internal data line, driving a differential data signal on a differential data bus in response to the received single-ended data signal, and enabling driving the differential data signal on the differential data bus using a transmitter enable signal in response to a digital state transition from the single-ended data bus.

In an embodiment, the method includes detecting a first rising edge of an EOP signal, sending an EOP start enable signal to a logic gate in response thereto to maintain the transmitter enable signal, detecting a last falling edge of the EOP signal, and removing an EOP end circuit enable signal to the logic gate so that the transmitter enable signal is disabled.

In an embodiment, the method includes detecting a first falling edge of the EOP signal, sending an EOP end enable signal to the logic gate, and removing the EOP start enable signal.

DETAILED DESCRIPTION

Figure 1:
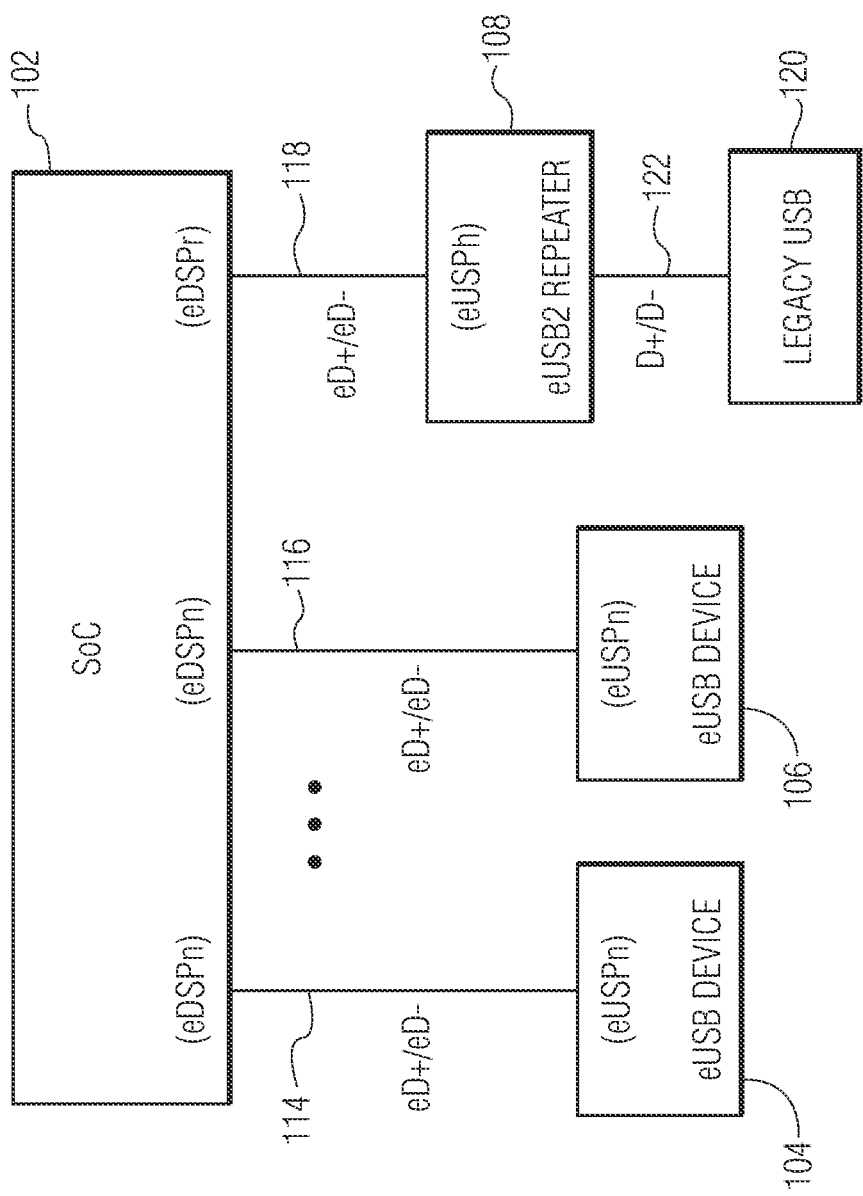
FIG. 1 is a block diagram of a system on a chip (SoC) that is coupled to multiple peripheral devices using eUSB.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Implementations of a repeater for single-ended and differential signals are described. An eUSB repeater, which is part of an eUSB PHY has a transparent mode, also referred to as a repeating mode which translates single-ended signals to differential signals and translates differential signals to single-ended signals. For eUSB, packets which start on the USB bus and are passed to the eUSB bus include Host to Device packets for Device side eUSB repeaters and Device to Host packets for Host side eUSB repeaters. Repeating mode is used to pass packets back and forth between a Host and a Device. As defined in technical standards, an eUSB PHY has other non-repeating modes not addressed herein that facilitate other functions for eUSB for example, startup, connection, suspend, wake, resume, bus reset, etc.

The eUSB2 Specification describes a supplement to USB 2.0 for low voltage, embedded use that operates in all three speed modes of USB 2.0: USB 1.0 Low Speed; USB 1.1 Full Speed; and USB 2.0 High Speed. Low Speed and Full Speed use single-ended signaling in eUSB2, while High Speed (sometimes called Hi-Speed) uses differential signaling in eUSB2. The eUSB2 Specification refers to repeater mode as eUSB2 to USB2 or as USB2 to eUSB2 regardless of the speed mode. In the present description "eUSB" will be used to refer to any modes of eUSB2 or any other suitable single-ended signaling system and "USB" will be used to refer to any modes of USB 2.0 or any other suitable modes of differential signaling. While the present description is presented in the context of Universal Serial Bus structures and methods, the structure and methods herein may be applied to translations between other single-ended and differential signaling systems. While the present description is presented in the context of Low Speed and High Speed mode, the present description may be applied to other modes and to successors of these modes, notwithstanding changes to the naming conventions that are used. It should be noted that USB has been implemented without consistently enforced naming conventions and that even these inconsistent naming conventions may be changed retroactively. Thus, it may happen that "USB 2.0" may soon be referred to primarily as "USB2."

The described eUSB repeater allows for improvements in cost, size, and power consumption. A smaller size is not only less expensive to produce but makes product design and packaging easier. Smaller semiconductor chips may be used in more places, especially in compact devices. Saving power means longer battery life, less heat, and a more enjoyable experience for the user. The eUSB repeater described herein may be an eUSB PHY or any other similar device. While repeater modes, also referred to as transparent modes, are emphasized herein, the described eUSB repeater may have additional modes and capabilities and may be incorporated into a larger system to perform additional functions.

FIG. 1 is a block diagram of a system on a chip (SoC) 102 that is coupled to multiple peripheral devices using eUSB. The SoC 102 is coupled to a first eUSB device 104 through an eUSB connection 114, which may be a single-ended connection in at least some modes. The SoC has a downstream eUSB2 port in native mode (eDSPn). The device has an upstream eUSB2 port in native mode (eUSPn). The eUSB connection 114 between these ports has lines with an eUSB2 data+ pin (eD+) and an eUSB2 data− pin (eD−). The eUSB connection 114 may be through PCB traces, wire lines, or any other suitable internal or embedded connection. An nth eUSB device 106 is coupled through an nth eUSB connection 116.

The SoC 102 is also coupled to one or more legacy USB devices 120. The SOC has a downstream eUSB2 port facing host repeater (eDSPr). That is connected through an eUSB connection 118 to an upstream eUSB2 port of the host repeater (eUSPh) at an eUSB2 repeater 108. The eUSB2 repeater 108 connects through a USB2 connection 122 to one or more legacy USB devices 120.

As shown, the SOC 102 operates in two modes of operation: native mode and repeater mode. The native mode refers to a host port, eDSPn, of the SoC 102 communicating directly to native eUSB devices 104, 106 through a device port, eUSPn, both implementing an eUSB PHY and communicating based on eUSB signaling, for example eUSB2 signaling. Native mode eUSB is particularly suitable for inter-chip interconnect.

Repeater mode refers to an eUSB port, eDSPr, of the SoC 102 communicating with a USB port of a USB legacy device 120 through a repeater 108 that translates between eUSB signaling and USB signaling, for example eUSB2 and USB 1.0, USB 1.1 or USB 2.0 signaling.

Figure 2:
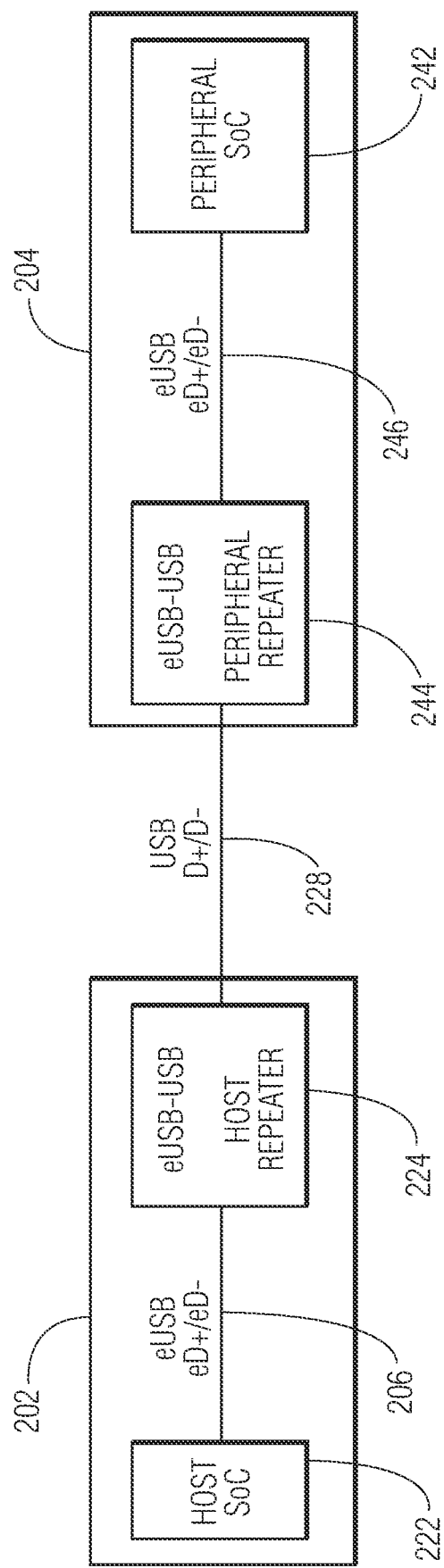
FIG. 2 is a block diagram of a host SoC coupled to a peripheral SoC connected through a USB line, for example a cable or PCB traces.

FIG. 2 is a block diagram of a host SoC 222 coupled to a peripheral SoC 242 connected through a USB line 228, for example a cable or PCB traces. In this example, the host SoC 222 is coupled through an eUSB link 206 with eD+/eD− lines to a host repeater 224. The peripheral SoC 242 is coupled through an eUSB link 246 with eD+/eD− lines to a peripheral repeater 244. The host repeater 224 and the peripheral repeater 244 are connected together using the USB line 228 with D+/D− lines. The host repeater 224 and the peripheral repeater 244 communicate with each other in a repeater mode, indicated as eUSB-USB. This configuration may be suitable for when two eUSB devices are connected through a USB line 228, for example a cable and USB connectors or ports at both sides of the device ports. The host SoC 222 and the peripheral SoC 242 are able to communicate using the lower voltage single-ended signaling that is more suitable for the physical construction of ICs while being connected using the more robust, higher voltage, USB differential signaling through the USB line 228. The host SoC and peripheral SoC may also be coupled to other devices (not shown) in native mode and in repeater mode.

Figure 3:
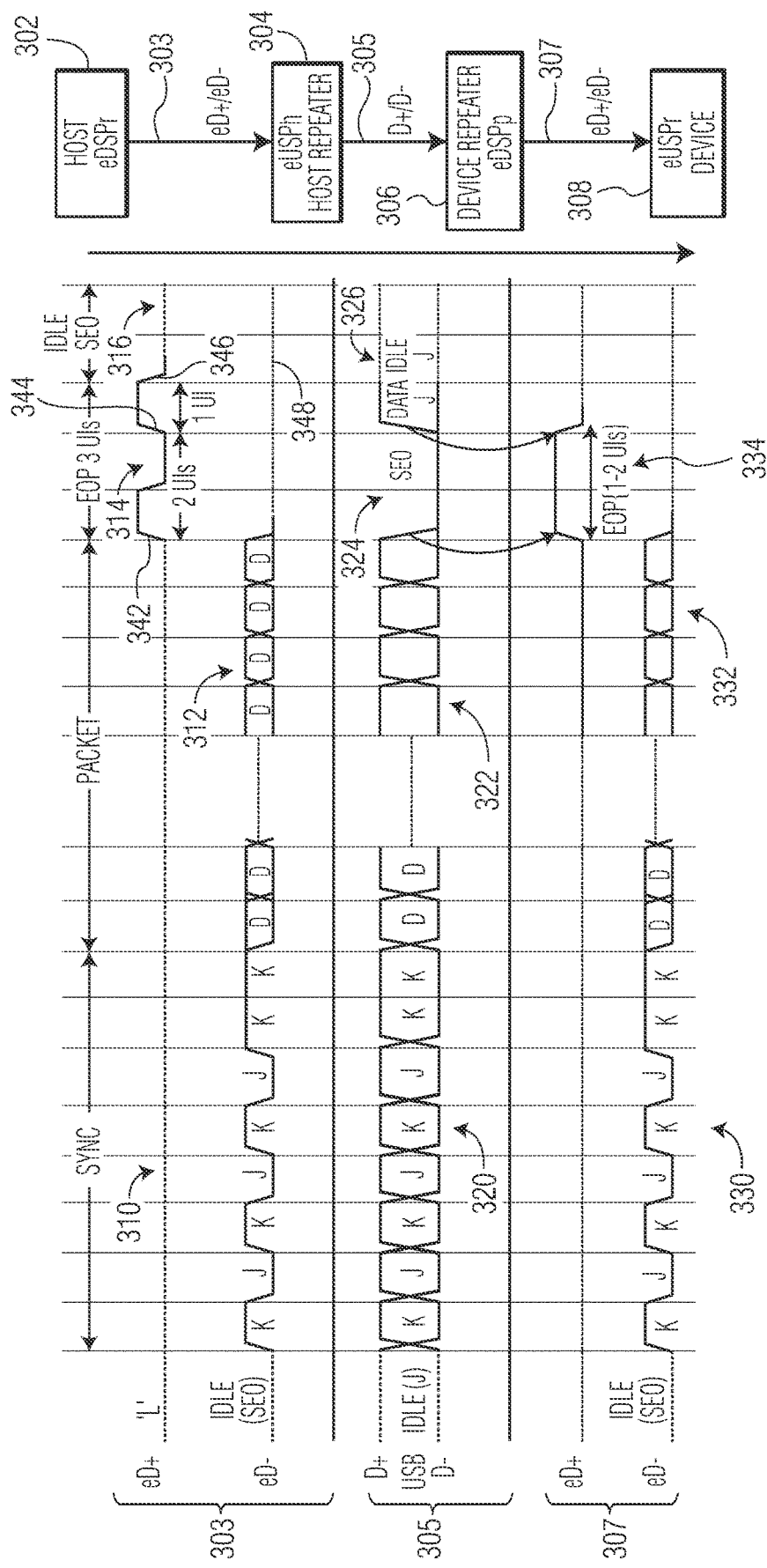
FIG. 3 is a signal timing diagram of a Full Speed packet being sent from an eUSB Host to an eUSB Device through a Host eUSB repeater and a Device eUSB repeater.

FIG. 3 is a signal timing diagram of a Full Speed packet being sent from an eUSB Host 302 to an eUSB Device 308 through a Host eUSB repeater 304 and a Device eUSB repeater 306. Full Speed mode, originally introduced with USB 1.1 is supported as a legacy mode in USB 2.0 and with a few changes from USB 1.1 in eUSB2. The top portion of the signal timing diagram shows the Host side eUSB bus 303, between the eUSB Host 302 and the Host eUSB repeater 304. The middle portion of the signal timing diagram shows the USB bus 305 between the Host eUSB repeater 304 and the Device eUSB repeater 306. The bottom portion of the signal timing diagram shows the Device side eUSB bus 307 between the Device eUSB repeater 306 and the eUSB Device 308.

The eUSB Host 302 initiates a Full Speed packet on its Host side eUSB bus 303. The packet from the eUSB Host 302 is shown on the top portion of the timing signal diagram on the Host side eUSB bus 303. The majority of the packet is sent on the eUSB bus eD− signal. The packet starts with the typical USB packet SYNC pattern 310, KJKJKJKK, and then is followed by the normal packet data 312. The packet ends with an End of Packet (EOP) pattern 314, toggling on the eUSB bus eD+ signal.

The middle portion of the timing signal diagram of FIG. 3 shows how the Full Speed packet from the eUSB Host 302 gets translated by the Host eUSB Repeater 304 and generated onto the USB bus 305. The Host eUSB repeater 304 first translates the single-ended signaling on eD− to differential signaling on USB. This happens to translate the SYNC pattern 320 and to translate the packet data 322. When the EOP pattern 314 occurs on the host side eUSB eD+ signal, the eUSB Repeater converts that to a USB formatted EOP for the USB bus. The first rising edge on eD+ 342 causes the eUSB repeater to drive an SE0 324 signal (Single-Ended Zero) on the differential lines in which the signal on both lines of the USB bus 305 are low. The second rising edge on eD+ 344 causes the eUSB Repeater to drive the USB bus 305 to a differential data J state 326. The last falling edge on eD+ 346 then causes the eUSB Repeater to tristate the USB bus and let the USB pullup and pulldown resistors hold the bus in an Idle J state. The SE0 condition provides a time gap between data packets.

For a digital data line with two voltage states, high and low, a tristate is a third state for which the line is set to a high impedance (high Z) with no particular applied voltage. As a result, any other device connected to the line is able to control the state of the line.

The device eUSB repeater 306 translates the signals on the USB bus 305 into eUSB single-ended signaling of the Device side eUSB bus 307 as shown on the bottom section of the timing signal diagram. The SYNC pattern 320 on USB bus 305 causes the device eUSB repeater 306 to drive the device side eUSB eD− line with the SYNC pattern 330. The packet data 322 on the USB bus 305 is translated as a data pattern 332 on the eUSB eD− line. The EOP on the USB bus 305 which is an SE0 324 followed by data J and idle J 326 causes the device eUSB repeater 306 to drive the eUSB eD+ line high to generate an EOP signal 334 during the USB bus condition of SE0 324 and then low afterwards.

USB Full Speed packets are also sent from the eUSB Device 308 to the eUSB Host 302 through the Device eUSB repeater 306 and the Host eUSB repeater 304. The packet and EOP signals from the eUSB Device 308 are the same as those from the eUSB Host 302 and translated through the repeaters in the same way but in the opposite direction. These signals are defined in the eUSB2 Specification and there is a reciprocity that applies to signals so that they are the same regardless of direction.

While FIG. 3 shows USB Full Speed mode packets in eUSB, USB Low Speed mode is also supported and may be used for packets from the Host to the Device and vice versa. In Low Speed mode the eUSB signals are swapped from how they are sent during Full Speed mode. Instead of using eD− on the single-ended line, it is eD+ which carries the SYNC signal and the packet data. Instead of eD+, it is eD− which carries the packet's EOP signals. Otherwise, the repeaters perform the same functions. The differential signals of the USB signal are the same except with reversed polarity. For example, a Full Speed J is transmitted as D+ being high while D− is low. A Low Speed J is transmitted as D− being high while D+ is low. In repeater mode, also referred to as transparent mode, the repeaters facilitate the passing of packets from each bus to the other bus, converting the single-ended signals to differential signals and vice versa as shown in FIG. 3. At an eUSB Repeater, if eD+ rises before eD−, then this indicates the start of a Low Speed mode packet. If eD− rises before eD+, then this indicates the start of a Full Speed mode packet.

Considering the idle signal 316 from the eUSB Host 302 or conversely from the eUSB Device 308, the single-ended line eD− is driven low for at least a certain duration before the eUSB Host 302 tristates the line eD−. This is shown as a dotted line 348 which extends beyond the diagram. The low state may last for 20-70 ns. In some examples, the line may be driven strongly low for 20-70 ns. After that the line may be tristated with pulldown resistors or some other means holding the value.

On the USB bus 305, there is a string of transitions during the SYNC pattern 320 and the packet data 322. At any of the data bit transitions on the USB bus 305 from J to K or K to J, there may be a period of time during which both lines are low before finally transitioning to the next bit state. This low state is referred to as SE0 (Single-Ended Zero). Instead of a clean J to K transition, the USB bus 305 may, for example, transition from J to SE0 and then from SE0 to K. This SE0 period is supposed to be less than 14 ns for USB Full Speed mode timing and less than 210 ns for USB Low Speed mode timing. An eUSB Repeater 304, 306 translating the packet from USB to eUSB filters out the temporary SE0 conditions.

Figure 4:
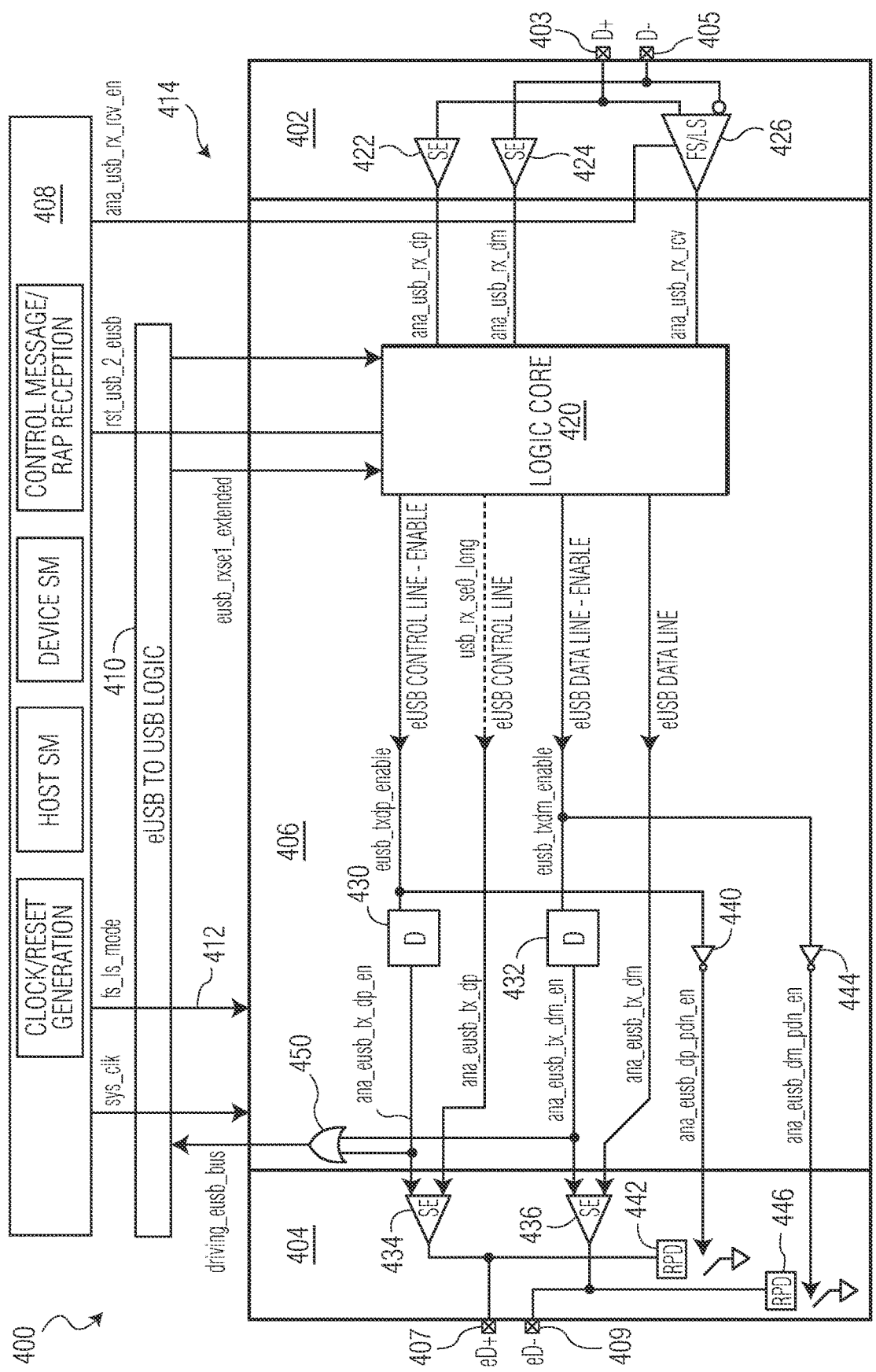
FIG. 4 is a block diagram of a repeater for use in converting differential signaling on a USB bus to single-ended signaling on an eUSB bus.

FIG. 4 is a block diagram of a repeater for use in converting differential signaling on a USB bus to single-ended signaling on an eUSB bus. The illustrated configuration is for Full Speed mode. For Low Speed mode, the data and control lines are reversed. An fs_ls_mode signal from high level logic 408 may be used to cause the repeater to reverse the data and control lines and make any other suitable configuration changes. The mode may be determined in an initial setup or configuration operation. The repeater 400 has USB to eUSB logic 414 with an analog differential receiver 402 with a D+ input port 403 and a D− input port 405. Power and other signals of the USB bus are routed to other parts of the system. The USB to eUSB logic 414 has an analog single-ended transmitter 404 with an eD+ output port 407 and an eD− output port 409 for single-ended signaling. Digital logic 406 of the USB to eUSB logic 414 connects the analog differential receiver 402 to the analog single-ended transmitter 404.

The digital logic 406 is coupled to high level logic 408. The high level logic 408 may include logic to handle non-repeating mode operations such as clock/reset generation, Host state machine (SM), Device SM, control message handling and register access protocol (RAP) reception. The control functions may include circuit startup, connection, suspend, resume, wake, bus reset, port reset detection, etc.

The digital logic 406 is also coupled to eUSB to USB logic 410 for processing eUSB to USB packets. The eUSB to USB logic 410 performs a similar function as the USB to eUSB logic 414. In the case of Full Speed and Low Speed modes, those functions include an analog differential receiver, digital logic, and an analog single-ended transmitter operating in the opposite direction and translating data signals from single-ended to differential. There are two signals coupled with this logic, a driving_eusb_bus signal and a driving_usb_bus signal. The driving_eusb_bus signal is an indication from the USB to eUSB logic that it is processing a packet from the USB bus and passing it to the eUSB bus. When this is true, this causes the eUSB to USB logic 410 to ignore the activity it sees on the eUSB bus. The driving_usb_bus signal is an indication to the USB to eUSB logic, in particular the digital logic 406, that a packet is being passed from the eUSB bus to the USB bus and so the USB to eUSB logic should not act on USB bus activity.

The analog differential receiver 402 converts the differential USB Full Speed mode signaling and Low Speed mode signaling into single-ended signaling for application to the digital logic 406. The analog differential receiver 402 has a D+ output driver 422 that is coupled to the D+ input port 403 and a D− output driver 424 that is coupled to the D− input port 405. The D+ output driver 422 and the D− output driver 424 are connected to the digital logic of the logic core 420. The D+ output driver 422 generates a dp (D positive) signal labeled as the ana_usb_rx_dp signal and the D-output driver 424 generates a dm (D minus) signal labeled as the ana_usb_rx_dm signal. In addition, the receiver output drivers convert the voltage of the differential data signal to a lower voltage for the single-ended data signal.

In some examples, the single-ended input, the ana_usb_rx_rcv signal, is high whenever D+ at the D+ input port 403 is greater than or equal to D− at the D− input port 405. For Full Speed mode, this means that a J condition (D+ high, D− low) results in the output of the analog differential receiver as "1" and that a K condition (D− high, D+ low) results in the output being "0." For Low Speed mode this means that a J condition (D− high, D+ low) results in the output of the analog differential receiver being "0" and that a K condition (D+ high, D− low) results in the output being "1." A differential receiver 426 receives the differential input signals from the D+ port 403 and inverted from the D− port 405 and an enable signal, the ana_usb_rx_rcv_en signal, from the high level logic 408. The differential receiver 426 then generates an internal data signal, the ana_usb_rx_rcv signal, that is connected to the logic core 420. The analog differential receiver 402 also maintains its previous state in the event an SE0 is present on the USB bus.

The digital logic 406 includes a logic core 420 that receives the output signals from the analog differential receiver 402. These signals are the ana_usb_rx_dp signal, the ana_usb_rx_dm signal, and the ana_usb_rx_rcv signal. Using these output signals as input signals to the logic core 420, the logic core 420 generates an eUSB Control Line output signal, an eUSB Data Line output signal and enable signals for each output, an eUSB Control Line Enable signal, and an eUSB Data Line Enable signal. For Full Speed mode, the eUSB Control Line output signal is coupled to an eD+ output driver 434 of the analog single-ended transmitter 404 that drives the eD+ signal at the eD+ output port 407. The eUSB data line output is coupled to an eD− output driver 436 of the analog single-ended transmitter 404 that drives the eD− signal at the eD− output port 409. For Low Speed mode, the polarity is reversed. The output drivers convert a voltage of the internal data line to the higher voltage or the lower voltage for the single-ended data bus, if necessary.

When the repeater 400 stops driving either eD+ or eD−, it first drives the respective line low for 20-70 ns before releasing it. In some embodiments, a delay cell 430 is used which transmits the eUSB Control Line Enable signal when it occurs and continues until the end of a delayed interval, for example for 20-70 ns. The delay cell 430 output is coupled to the eD+ output driver 434 so that the eD+ output driver 434 is enabled as long as the delay cell 430 is high. When enabled, the eD+ output driver 434 drives the eD+ output port 407 with the eUSB Control Line signal.

A second delay cell 432 is coupled to the eUSB Data Line Enable signal in the same or a similar way so that the delay cell 432 transmits the eUSB Control Line Enable signal when it occurs and continues until the end of the delay, for example for 20-70 ns. The second delay cell 432 output is coupled to the eD− output driver 436 so that the eD− output driver 436 is enabled as long as the second delay cell 432 is high. When enabled, the eD− output driver 436 drives the eD− output port 409 with the eUSB Data Line signal.

The digital logic 406 also connects the eUSB Control Line Enable signal to an inverter 440 and a switched pulldown resistor 442. The switched pulldown resistor 442 is coupled to the eD+ output port 407 when the eUSB Control Line Enable signal is low to pull down the eD+ output port when there are no Control signals being driven by the eUSB repeater on the Control Line Enable. Similarly, the eUSB Data Line Enable signal is connected to an inverter 444 and a switched pulldown resistor 446. The switched pulldown resistor 446 is coupled to the eD− output port 409 to pull down the eD− output port when the eUSB Data Line enable signal is low which is when there are no data signals being driven by the eUSB repeater on the eUSB Data Line. The enable signals for the eUSB pulldown resistors 442, 446 on the eD+ and eD− lines are labeled as the ana_eusb_dp_pdn_en signal and the ana_eusb_dm_pdn_en signal, respectively.

The digital logic 406 also connects the eUSB Control Line Enable signal and the eUSB Data Line Enable signal as inputs to a logic gate, for example an OR gate 450. The OR gate 450 output indicates whether either signal is high and this output is provided to the eUSB to USB logic 410. This provides an indication that the repeater 400 is currently passing an incoming USB packet to eUSB.

Figure 5:
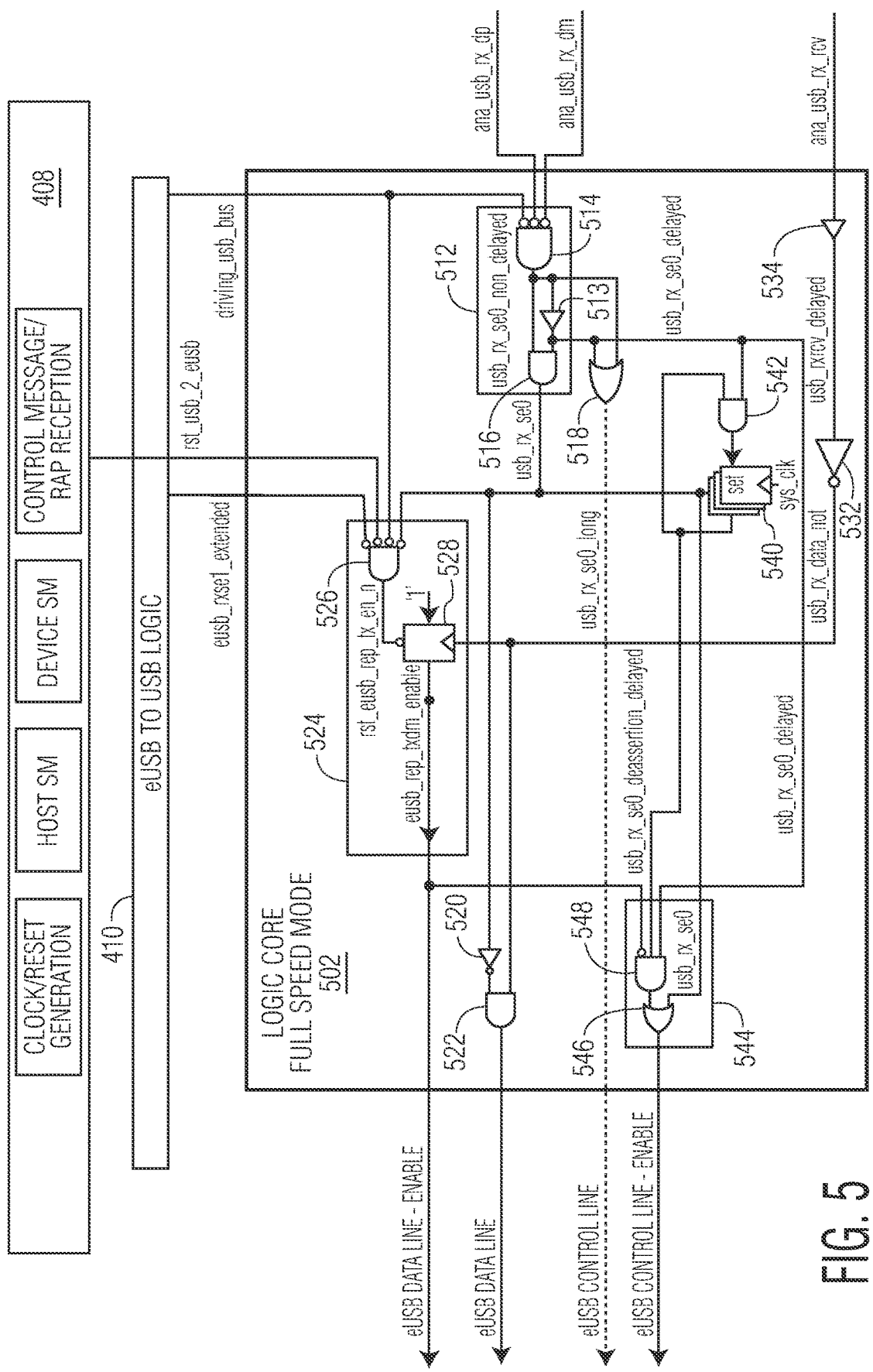
FIG. 5 is a block diagram of a logic core suitable for use as the logic core of the repeater for Full Speed (FS) mode.

FIG. 5 is a block diagram of a logic core 502 suitable for use as the logic core 420 of the repeater 400 for Full Speed (FS) mode. As described above, the eUSB Data Line carries the single-ended translation of the data from the analog differential receiver 402 that provides the ana_usb_rx_rcv signal, the internal data signal, for data detection from the differential receiver 426. The analog differential receiver also provides the ana_usb_rx_dp signal and the ana_usb_rx_dm signal for detection of EOP. During Full Speed mode, the data is received in inverted form. A USB "J" comes in as a "1" and so the signal is inverted to translate to the eUSB bus. When a Full Speed USB packet starts, the USB bus will go from Idle J to data K. The data from the differential receiver 426, the ana_usb_rx_rcv signal is inverted during Full Speed mode at an inverter 532. For Low Speed mode another inverter 520 is coupled to a logic gate, for example an AND gate 522.

The inverter 532 output, the usb_rx_data_not signal, is also connected to an enable flip-flop 528. The enable flip-flop is part of an enable control circuit 524 that includes the enable flip-flop 528 and a reset gate 526 that is coupled to the reset port of the enable flip-flop 528 and determines when to reset the enable flip-flop 528. At the start of a Full Speed packet the inverter 532 causes a "0" to "1" transition on the clock input to the enable flip-flop 528. The enable flip-flop 528 is a rising edge flip-flop and generates an output signal, labeled the eusb_rep_txdm_enable signal. This output signal is set until an SE0 (single-ended zero) condition that occurs at the EOP.

The enable flip-flop output, the eusb_rep_txdm_enable signal, causes the eUSB data line to be enabled. The enable flip-flop 528 output causes the eUSB data line to be enabled at the eD– output driver 436 shown in FIG. 4 to start driving packet data onto the eUSB bus. The eUSB Data Line determines the data that is driven onto the eUSB bus. The eUSB Data Line is driven by a path that starts from the ana_usb_rx_rcv signal output of the analog differential receiver 402, through a delay cell 534, the inverter 532 and the AND gate 522. The delay cell 534 delays the single-ended data signal based on a delay applied in the input filter circuit 512 that is after an SE0 condition of the Full Speed packet ends on the differential data signal.

As shown in FIG. 3, at the end of a packet, the EOP signaling includes the USB bus transitioning from data to a prolonged SE0 (with a duration of at least 1 UI) followed by a J condition. Upon detection of a valid SE0 the repeater 400 will stop driving the eUSB Data Line and drive the eUSB Control Line high.

A filtered SE0 indication, the usb_rx_se0 signal, from an input filter circuit 512 is applied through an AND gate that forms the reset gate 526 of the enable control circuit 524 to generate a reset signal, the rst_eusb_rep_tx_en_n signal, that is coupled to the enable flip-flop 528 and resets the enable flip-flop 528. The enable flip-flop 528 generates a reset eusb_rep_txdm_enable signal to disable the eUSB data at the eD– output driver 436. When this occurs, the eusb_rep_txdm_enable signal is then deasserted causing the eUSB data driver to be disabled.

The eUSB to USB logic 410 determines, as a part of its operation, whether there is an SE1 (Single-Ended One) condition present on the eUSB bus. When that occurs, it generates a reset signal, labeled as the eUSB_rxse1_extended signal, to the enable control circuit 524. The SE1 condition occurs when an incoming USB packet is being passed to the eUSB bus at the same time that the eUSB host or device is trying to generate a Port Reset or a Control Message. Setting the eusb_rxse1_extended signal resets the enable flip-flop 528 and disables the eUSB Data Line to prevent the error. The eUSB to USB logic 410 may also generate a driving_usb_bus signal that is also coupled to the reset gate 526. The driving_usb_bus signal provides an indication that other circuitry is currently passing an incoming eUSB packet to the USB bus.

The high level logic 408 may also generate a rst_usb_2_eusb signal to reset the enable flip-flop 528. This is a general reset signal for the USB to eUSB logic and could be part of the normal power on operation or for some other reason.

The output of the reset gate 526 is labeled as the rst_eusb_rep_tx_en_n signal. This is the reset for the enable flip-flop 528. It will be asserted low at the end of a packet by the filtered SE0 indication. It will also be asserted low for any error detection detected by four other inputs to the reset gate 526. As explained above these include any eUSB SE1 conditions due to possible port reset or control messages as indicated by the eusb_rxse1_extended signal, any reset from the high level logic 408 possibly including power on reset, resets during control message reception, resets during non-repeating modes, etc., and any time the design is passing an eUSB packet to the USB bus.

Returning to the input filter circuit 512, the output filtered SE0 indication signal, the usb_rx_se0 signal, is also applied through an inverter 520 to AND gate 522 that is coupled to the eUSB Data Line. The output of the AND gate 522 is the eUSB Data Line. The outgoing eUSB data is the other input to the AND gate 522 so that the eUSB Data Line is forced low. The eUSB Data Line is forced low because the actual eUSB data driver will be kept enabled for 20-70 ns to drive the line low before releasing it. The filtered SE0 indication signal, the usb_rx_se0 signal, also enables the eUSB Control Line via a complex gate 544 in the logic core 502 that is coupled to the eUSB Control Line Enable. The eUSB Control Line driver data output is driven high upon the filtered SE0 indication using a "long" version of the SE0 status.

The end of USB packet's end of packet (EOP) signaling may be detected when the USB bus goes from the EOP's SE0 state to the J state. Upon detecting the end of the EOP, the repeater 400 stops driving the eUSB control line. The eUSB Control Line may be released after the SE0 condition ends. In some embodiments this is done using the eUSB Control Line Enable signal and the eUSB Control Line value. The eUSB Control Line Enable line will stop being driven after a time duration $T_{SE0\_Filt}$ after the end of the SE0 condition by use of the complex gate 544. The eUSB Control Line value will be held high during SE0 on the eUSB Control Line and will go low after a time duration $T_{SE0\_Filt}$ after the end of the SE0 condition by use of an OR gate 518 that is connected between the input filter circuit 512 and the eUSB Data Line.

The repeater 400 is also able to pass keep alive signaling from eUSB to USB. This has the same timing on USB as a normal packet EOP (described above) and results in the eUSB bus being driven to SE0 then data J then idle J as described above as well.

In the translation to eUSB, the SE0 signal is filtered. The repeater 400 detects a valid SE0 from the USB EOP. The eUSB2 Specification states that there may be an SE0 between each data bit transition, and that the USB bus may transition through the SE0 state for up to 14 ns in Full Speed mode operation. Since this transition is not a valid EOP SE0 state for eUSB signaling, the repeater 400 filters this out. This is accomplished using the D+ output driver 422 and the D– output driver 424 of the analog differential receiver 402 connected to logic gates, for example AND gates 514, 516 of the input filter circuit 512.

The first AND gate 514 of the input filter circuit 512 is used to detect the unfiltered SE0 condition. The two single-ended input lines from the differential receiver, the ana_usb_rx_dp signal and the ana_usb_rx_dm signal are coupled as inverted signals to the first AND gate 514. A driving_usb_bus signal from the eUSB to USB logic 410 is also coupled to the first AND gate 514. The driving_usb_bus signal provides an indication to the first AND gate 514 that other circuitry is currently passing an incoming eUSB packet to the USB bus. When this signal is low, it indicates that an eUSB repeater side of the repeater 400 is not in the process of passing a packet from an eUSB bus to the USB bus as indicated by the driving_usb_bus signal. When this signal is low and the single-ended input lines are low, then the AND condition is satisfied and the first AND gate 514 output goes high. This indicates an SE0 condition is present on the USB bus for an incoming packet.

This output is applied to a first input of a second AND gate 516 of the input filter circuit 512. The second input of the second AND gate is an analog delay cell 513. The second AND gate goes high when the first AND gate is high and the delay has been reached. This output is a signal labeled the usb_rx_se0 signal. The analog delay cell 513 may be set to 14 ns or more to allow filtering of the false SE0 conditions. Because delay cells will have a range of values due to process, voltage, and temperature (PVT), a typical value will be higher than 14 ns such that the minimum value will be at least 14 ns over PVT. The maximum value may be kept to less than 23 ns to help keep the delay through the logic core 502 low. This delay is the value $T_{SE0\_Filt}$, referred to herein. The second AND gate 516 simply ANDs the unfiltered SE0 indication from the first AND gate 514 with the delayed version from the delay cell 513. This produces the usb_rx_se0 signal, which is the filtered SE0. It will be asserted after a delay time $T_{SE0\_Filt}$ after the valid SE0 condition and de-asserted as soon as the SE0 condition ends. This means that it will shorten the actual SE0 condition.

The delay cell 513 of the input filter circuit 512 that generates the usb_rx_rcv_delayed signal may be configured to match the SE0 filtering delay. The USB specification states that the SE0 of the EOP must be delayed no less than the maximum delay of the data, but no more than 15 ns greater than the maximum delay of the data. In some examples, the SE0 delay is 20 ns. However, shorter or longer delays may be used. Since the SE0 filtering introduces a delay in the EOP generation on the eUSB Control Line, this same delay may be matched in the data path. The particular delay may be selected to suit different implementations. In one embodiment, the SE0 filtering delay is selected as 20 ns, the data delay is 10 ns, and the actual delay of the usb_rx_rcv_delayed signal is therefore 10 ns, although different amounts may be used.

The missing time caused by shortening the actual SE0 condition is recovered by using the output of the delay cell 513 as a signal for the simple delayed version of SE0 labeled the usb_rx_se0_delayed signal to extend the time that the eUSB control line is enabled. The filtered SE0 indication, the usb_rx_se0 signal, also enables the eUSB Control Line via a complex gate 544 in the logic core 502. The eUSB Control Line Enable is the output of the complex gate 544.

Figure 13:
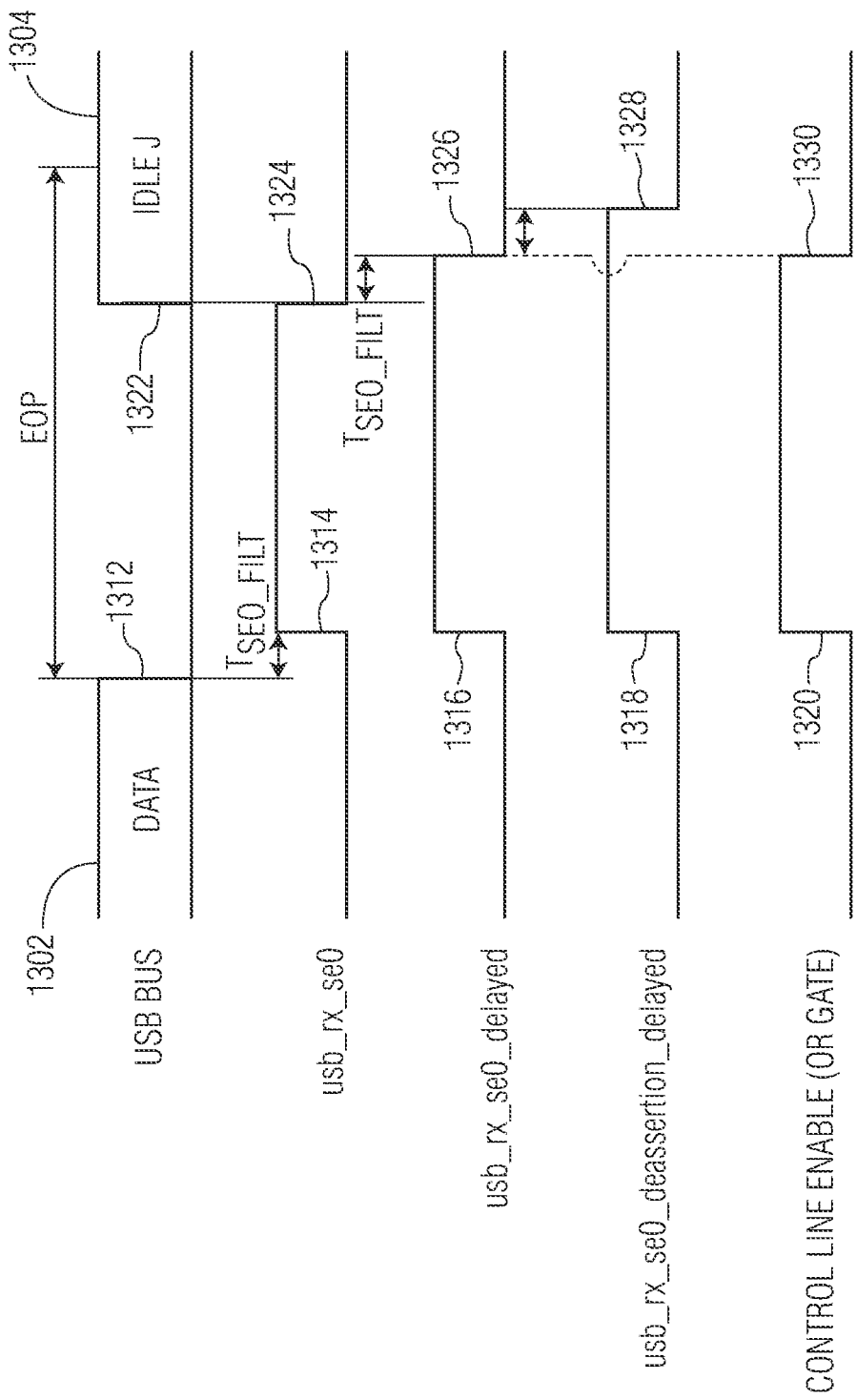
FIG. 13 is a timing diagram of some of the signals of FIG. 5 to show the relative SE0 filtering delays.

FIG. 13 is a timing diagram of some of the signals of FIG. 5 to show the relative SE0 filtering delays. The input data signal, USB Bus, has a Data portion 1302 and an Idle J portion 1304 with EOP in between. The transition 1312 from the Data portion 1302 to the EOP is at a time before any delay. This represents the input to the input filter circuit 512. The usb_rx_se0 signal has a transition that is delayed by the value $T_{SE0\_Filt}$ due to the input filter circuit 512 so that the transition 1314 at the end of the Data portion 1302 is delayed but the transition to the Idle J portion 1304 is not delayed. The usb_rx_se0_delayed signal is an output of the delay cell 513 of the input filter circuit 512 and has a transition 1316 from the Data portion 1302 that is delayed and aligned with the usb_rx_se0 signal but the transition 1326 to the Idle J portion 1304 is also delayed by the same value $T_{SE0\_Filt}$. As mentioned, this extends the time that the eUSB control line is enabled. The eUSB Control Line Enable signal has a transition 1320 aligned with the usb_rx_se0 signal but the transition 1330 at the start of the Idle J portion 1304 is delayed by the value $T_{SE0\_Filt.}$ to align with the usb_rx_se0_delayed signal. This is due to the connections through the complex gate 544.

The complex gate 544 has an output from an OR gate 546 that is coupled to a three-terminal AND gate 548. The OR gate 546 inputs are coupled to the usb_rx_se0 signal and to the output of the three-terminal AND gate 548. The output of the complex gate 544 is high when either the usb_rx_se0 signal is high or when the three-terminal AND gate 548 is high. The three-terminal AND gate 546 has a first input coupled to the usb_rx_se0_delayed signal from the delay cell 513, a second input coupled to a usb_rx_deassertion_delayed signal described below, and a third input coupled to the inverse of the eusb_rep_txdm_enable signal described above which is the eUSB Data Line Enable.

When the first two are high and the eUSB Data Line Enable is low then the eUSB Control Line Enable is extended beyond the time of the usb_rx_se0 signal. This provides the "long" version of the SE0 status.

Even though the logic core 502 stops driving the eUSB data for a time duration, $T_{SE0\_Filt}$, after the SE0 for the EOP starts, and even though the logic core 502 stops driving the eUSB control line after the time duration, $T_{SE0\_Filt}$, after the SE0 condition ends, the delay cells 430, 432 for the eUSB Data Line Enable and the eUSB Control Line Enable hold the lines enabled for a little longer. The delay time indicated as $T_{SE0\_Filt}$ is the delay applied to the usb_rx_se0 signal from the input filter circuit 512, which is the filtered SE0. The usb_rx_se0 signal is asserted at a time equal to this delay time after the valid SE0 condition and the usb_rx_se0 signal is de-asserted as soon as the SE0 condition ends. The delay cells 430, 432 provide a delay for about 20-70 ns region and given the expected process-voltage-temperature (PVT) variations may provide a delay of about 40 ns. A range of 40 ns+/−40% is within an acceptable 20-70 ns range. The delay cells 430, 432 balance out the delay caused in the input data at the delay cell 534 applied to the input data, the ana_usb_rx_rcv signal.

The usb_rx_se0_deassertion_delayed signal is generated in a set of three back-to-back flip-flops 540. This usb_rx_se0_deassertion_delayed signal is only asserted for a valid SE0 from an incoming USB packet's EOP. It is de-asserted some amount of time after the SE0 condition has gone away. It may be held longer than the value $T_{SE0\_Filt}$ to ensure that the eUSB Control Line is asserted long enough after the EOP.

The three back-to-back flip-flops 540 all use an asynchronous set signal which is the usb_rx_se0 signal. As a result, they all asynchronously go high when the usb_rx_se0 signal is asserted. This transition is shown as transition 1318 of FIG. 13. They remain high until the usb_rx_se0 signal goes low plus, for example, at least 2 clocks received at a clock input of each flip-flop. This is shown as the transition 1328 of FIG. 13 which has a delay after the usb_rx_se0_delayed signal. The clocks may be from a clock signal, labeled the sys_clk signal, generated by the high level logic 408. It may be used as a base reference for all of the flip-flops in the logic circuit. The usb_rx_se0_deassertion_delayed signal holds the Control Line Enabled high at the complex gate 544 until after the usb_rx_se0 is deasserted. Considering the signal timing, the usb_rx_se0 signal deasserts as soon as the USB SE0 condition goes away. The usb_rx_se0_delayed signal may be asserted between each data bit, and not only at a packet's EOP. In this example, the control line is enabled for as long as the usb_rx_se0 signal is asserted plus the time that the usb_rx_se0_delayed signal is asserted. This provides that the usb_rx_se0 signal deassertion is used to qualify the use of the usb_rx_se0_delayed signal so that it is only used at the end of packet The clock frequency for the sys_clk signal is not critical. With the illustrated three flip-flops 540, when two clock periods are more than the SE0 filter delay, $T_{SE0\_Filt}$, then the timing described above is maintained. A similar result may also be performed with different circuits, for example, latches. The usb_rx_se0_deassertion_delayed signal is an indication of the SE0 condition on the USB bus but is only asserted with the filtered SE0 status and is held a bit after the SE0 filtered SE0 status has been de-asserted.

Figure 6:
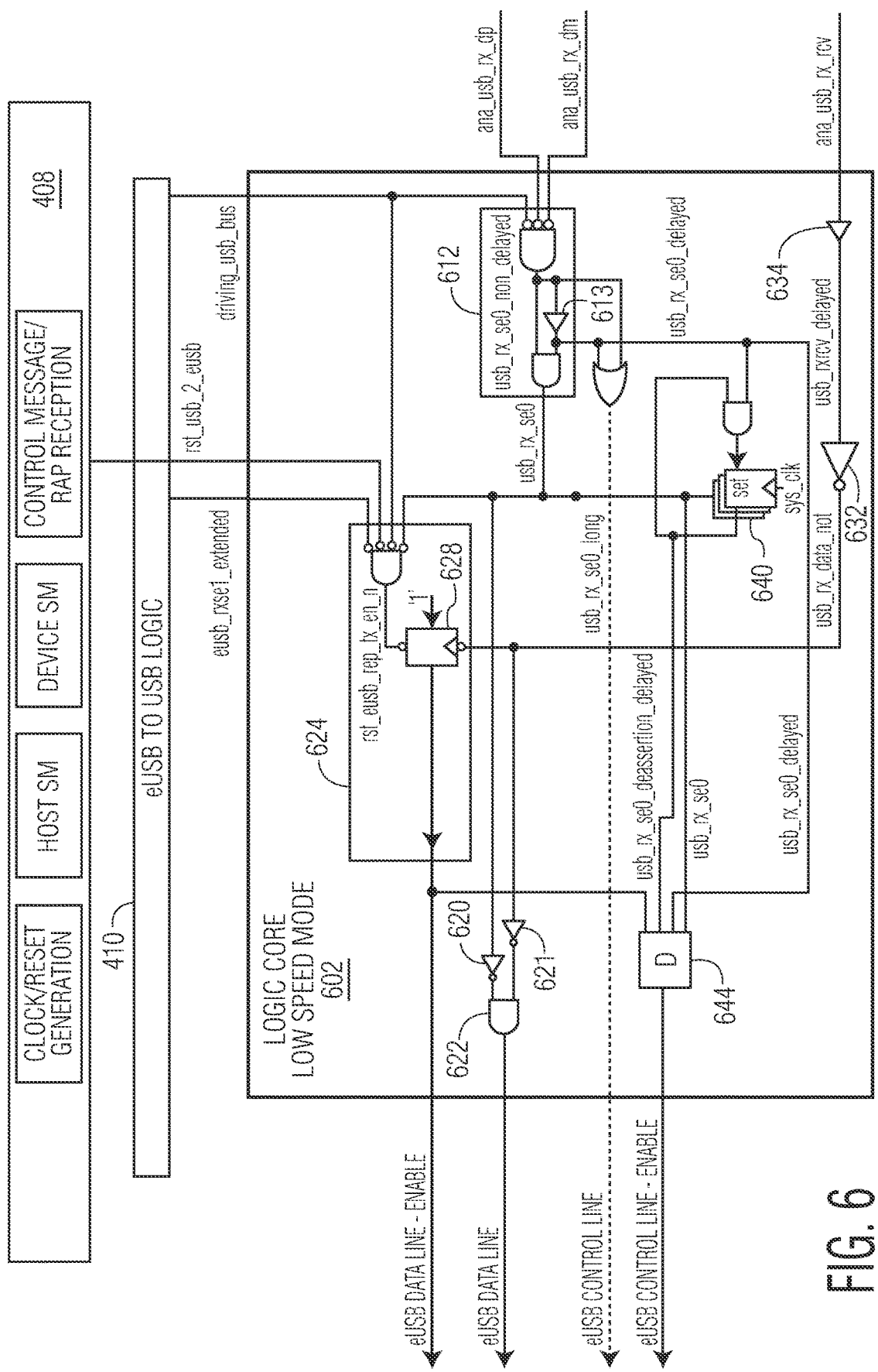
FIG. 6 is a block diagram of a logic core suitable for use as the logic core of the repeater for Low Speed (LS) mode on the differential USB bus.

FIG. 6 is a block diagram of a logic core 602 suitable for use as the logic core 420 of the repeater 400 for Low Speed (LS) mode on the differential USB bus. The logic core 602 includes an input filter circuit 612, an enable control circuit

624, an AND gate 622 at the eUSB Data Line, and a complex gate 644. These components have the same structure and operation as described above with respect to the logic core 502 for FS mode. The logic core 602 for LS mode also receives the same control and reset messages from the high level logic 408, the eUSB to USB logic 410 and the lockup detection circuit 412. These messages operate in the same way as described above.

The logic core 602 is coupled to and receives data as an internal data signal from the differential receiver 426 of the analog differential receiver 402 and is coupled to and sends data to the analog single-ended transmitter 404. As described above, the eUSB Data Line carries the internal data signal, in some cases a single-ended translation of the data, from the differential receiver 426. The analog differential receiver also provides the ana_usb_rx_dp signal and the ana_usb_rx_dm signal for detection of EOP. In contrast to Full Speed mode, in Low Speed mode, the eUSB control line is eD− and the eUSB data line is eD+. During Full Speed mode, the data is received in inverted form but during Low Speed mode, the data is not inverted. A USB "K" comes in as a "1." When a Low Speed USB packet starts, the USB bus will go from Idle K to data J. The data from the analog differential receiver 402 is inverted also during Low Speed mode at an inverter 632. The inverter 632 is coupled through another inverter 621 to an AND gate 622. The AND gate 622 output produces the non-inverted eUSB Data Line as described above with respect to FIG. 4.

The start of a packet in LS is a "0" to "1" transition on the output of the analog differential receiver 402. Because this goes through the inverter 632, it becomes a "1" to "0" transition. The usb_rx_data_not signal from the inverter 632 is provided to the AND gate 622 and also to the enable flip-flop 628 of the enable control circuit 624. However, in contrast to the rising edge enable flip-flop 528 of FIG. 5, the enable flip-flop 628 for LS mode is configured to trigger on the falling edge. This may be the same flip-flop as is used in FS for the logic core 502 that is configured to operate in different modes or a different flip-flop that is switched in to change USB modes.

In the logic core 602, the SE0 filtering is larger for LS mode because the possible SE0 that may be seen during data transitions is as long as 210 ns as defined by the USB specification. The recommended filter delay is about 250 ns. Over PVT this will be greater than 210 ns as long as the delay elements are fabricated to an accuracy of within a +/−15% variation. The maximum delay requirement from the USB specification indicates that the maximum delay through a hub should be less than 300 ns during LS mode. The SE0 filtering is performed within the input filter circuit 612 that has a delay element 613. This delay element generates the usb_rx_se0_delayed signal that is used to extend the usb_rx_se0 signal. As described above the usb_rx_se0 signal is connected as an input to the enable control circuit 624, the complex gate 644, and the AND gate 622 at the eUSB Data Line. The usb_rx_se0_delayed signal is a part of the input filter circuit and is connected as an input to the eUSB Control Line, the complex gate 644, and the set of three flip-flops 640 that generate the usb_rx_se0_deassertion_delayed signal.

The data delay may be adjusted to match the SE0 filter delay described above for FS mode using about 10 ns for the delay labeled as $T_{SE0\_Filt}$. For LS mode, the filter mode is configured to accommodate the SE0 delay of about 250 ns. Using the 10 ns difference described above the SE0 filter delay would be about 240 ns. Different values may be selected to meet different circumstances. This delay is implemented using a delay cell 634 between the input signal the ana_usb_rx_rev signal and the inverter 632 at the data input that generates the signal the usb_rx_data_not signal. The output of the delay cell 634 is a signal labeled as the usb_rxrcv_delayed signal.

Figure 7:
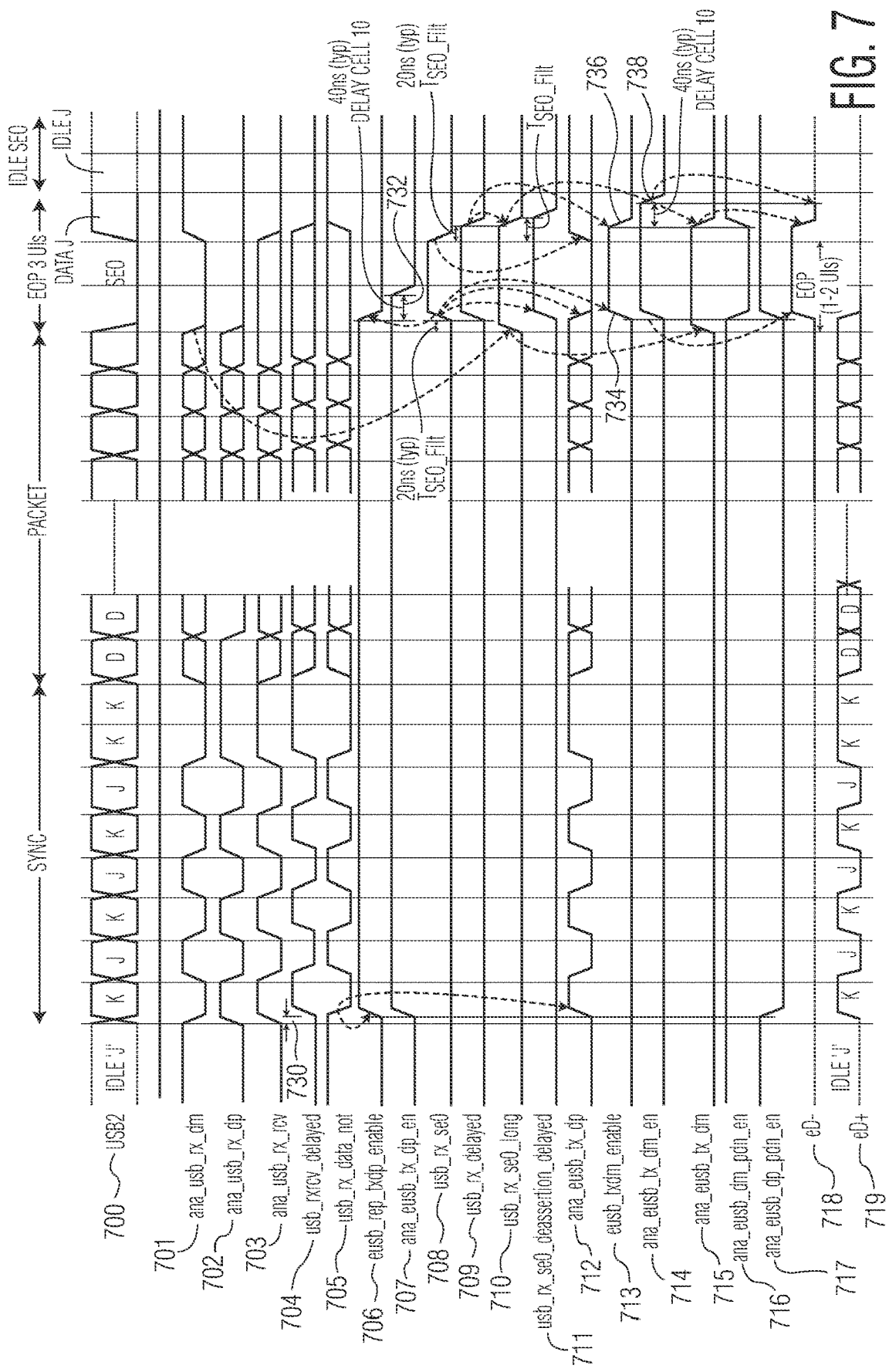
FIG. 7 is a signal timing diagram for the circuit for Low Speed mode described above with respect to FIGS. 4 and 6.

FIG. 7 is a signal timing diagram for the circuit for Low Speed mode described above with respect to FIGS. 4 and 6. The timing for Full Speed mode from USB to eUSB during transparent (repeating) mode is the same except that the eD− output signal carries the data and the eD+ output signal carries the EOP signaling.

Most of the signals in the timing diagram are indicated at locations on particular lines in FIGS. 4, 5, and 6. In the timing diagram the signals are identified with reference numbers and may be described as follows:

701 ana_usb_rx_dm—This is the input from the analog differential receiver on the differential USB bus D− line.

702 ana_usb_rx_dp—This is the input from the analog differential receiver on the differential USB bus D+ line.

703 ana_usb_rx_rcv—This is the input from the analog differential receiver on the USB bus.

704 usb_rxrcv_delayed—This is a delayed version of ana_usb_rx_rcv. The delay for USB is typically 240 ns indicated at 730 but may be modified to suit different circumstances. The delayed transition is propagated through the repeater to all of the signals 705-719 of the timing diagram below this signal.

705 usb_rx_data_not—This is the inverted version of the delayed data from the analog differential receiver. The inversion is needed during FS mode.

706 eusb_rep_txdp_enable—This tracks the duration of the USB data portion of the packet during Low Speed mode. It is set upon the first bit of the packet (J to K transition on USB bus) and remains asserted until the start of the packet's EOP. It is used to enable the eUSB data line during LS mode.

707 ana_eusb_tx_dp_en—This is the actual enable for eD+ going to the analog output drivers. It has a delay for USB of typically 40 ns indicated at 732 as applied by the delay cell 430 coupled to the signal eusb_txdp_enable. This delay may be used when disabling the eUSB Data Line to force a low value on the eUSB Data Line for 40 ns and going to a tristate.

708 usb_rx_se0—This is a filtered USB SE0 indication filtered based on mode. For FS mode it filters out SE0 conditions <14 ns. For LS mode it filters out SE0 conditions <210 ns.

709 usb_rx_se0_delayed—This is a delayed version of usb_rx_se0_non_delayed delayed by the length of the SE0 filter, $T_{SE0\_Filt}$.

710 usb_rx_se0_long—This is the OR of the above two signals. It is "long" because it is asserted when the real time SE0 indication is asserted and held asserted until the delayed version is de-asserted.

711 usb_rx_se0_deassertion_delayed—This is an indication of SE0 condition on USB but is only asserted with the filtered SE0 status and is held a bit after the SE0 filtered SE0 status has been de-asserted.

712 ana_eusb_tx_dp—This is the data output for eD+ going to the analog output drivers.

713 eusb_txdm_enable—This is the enable for the eD− output driver before being extended for 20-70 ns at the eUSB Control Line Enable of the second delay cell 432. It is asserted with the usb_rx_se0 signal 709 and it is de-asserted with the usb_rx_se0_delayed signal 709.

714 ana_eusb_tx_dm_en—This is the actual enable for eD− going to the analog output drivers. This signal is extended typically about 40 ns at 738 by the second delay cell 432 coupled to the eUSB Control Line enable. As a result, the eD+ line is driven low after the SE0. This extension of the eD− enable signal means that the eUSB to USB logic 410 will not detect eUSB data during the additional 40 ns after the transmission of the eUSB packet on eD+ or eD− is completed. The end of a transmitted eUSB packet is not detected as a new received eUSB packet from the other direction.

715 ana_eusb_tx_dm—This is the data output for eD− going to the analog output drivers. It is low until the EOP. It is asserted with the unqualified SE0 provided by the usb_rx_se0_long signal 710. It is de-asserted with the usb_rx_se0_delayed signal 709.

716 ana_eusb_dm_pdn_en—This is the enable for the eUSB pulldown resistors on the eD− line.

717 ana_eusb_dp_pdn_en—This is the enable for the eUSB pulldown resistors on the eD+ line.

718 eD−—This is the eUSB eD− output line sent in transparent mode. It is de-asserted until the EOP.

719 eD+—This is the eUSB eD+ output line sent in transparent mode. It carries the SYNC and packet data in LS mode.

Figure 8:
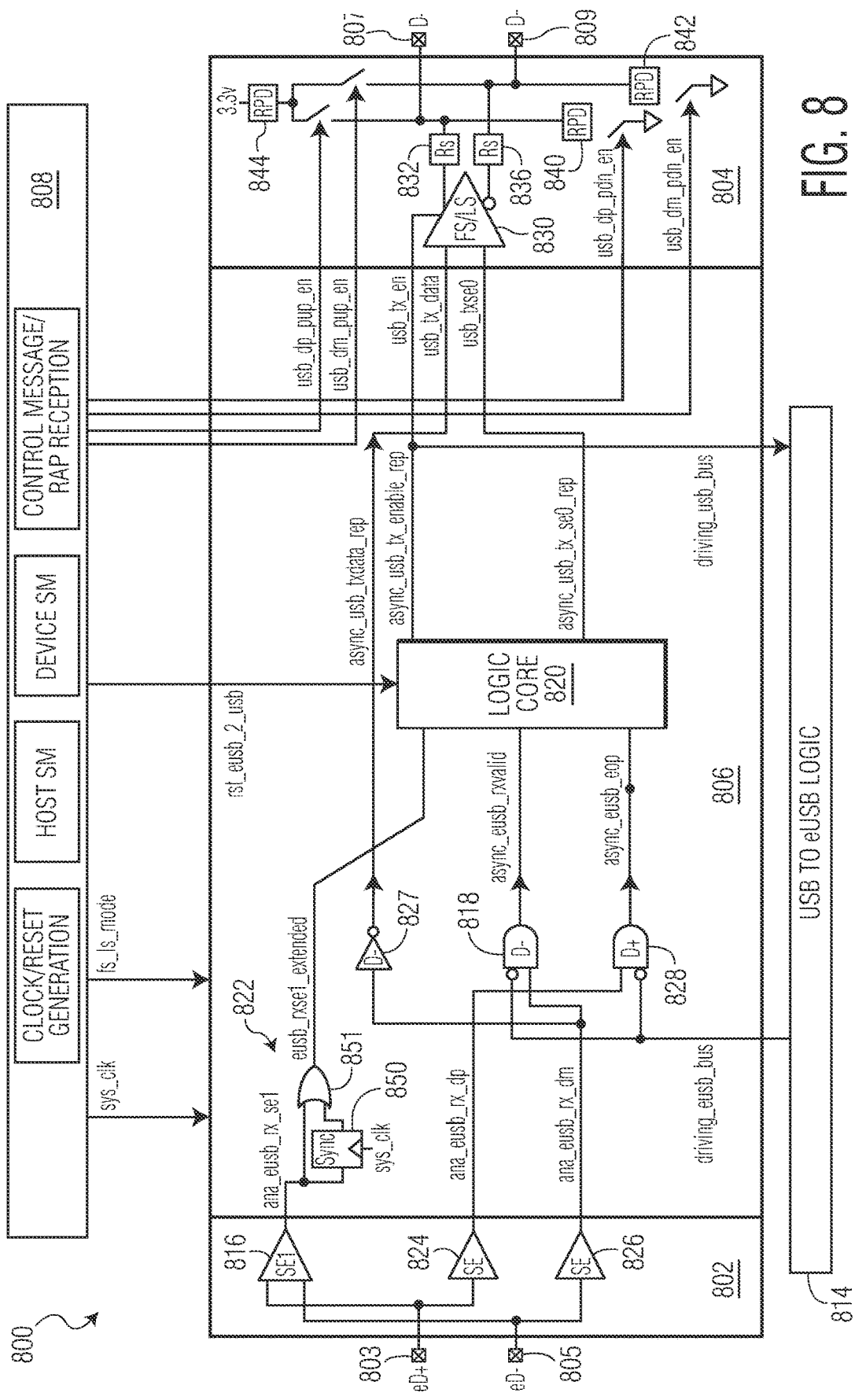
FIG. 8 is a block diagram of a repeater for use in converting single-ended signaling on an eUSB bus to differential signaling on a USB bus for Full Speed mode.

FIG. 8 is a block diagram of a repeater for use in converting single-ended signaling on an eUSB bus to differential signaling on a USB bus for Full Speed mode. The repeater 800 has an analog single-ended receiver 802 with an eD+ input port 803 and an eD− input port 805. An analog differential transmitter 804 has a D+ output port 807 and a D− output port 809 for differential signaling. Power and other signals of the USB bus are routed to other parts of the system. Digital logic 806 connects the analog single-ended receiver to the analog differential transmitter. For Full Speed mode, the AND gates 818 and 828 use eD− to detect the start of a packet and eD+ to detect the EOP. This is reversed for Low Speed mode. Also, the inverter 827 is used in Full Speed mode but not in Low Speed mode.

The digital logic 806 is coupled to high level logic 808. The high level logic 808 may include logic to handle non-repeating mode operations such as clock/reset generation, Host SM, Device SM, control message handling and register access protocol (RAP) reception. The control functions may include circuit startup, connection, suspend, resume, wake, bus reset, port reset detection, etc.

The digital logic 806 is also coupled to USB to eUSB logic 814 for processing USB to eUSB packets. The USB to eUSB logic 814 may be the same as or similar to that shown and described with respect to FIGS. 4, 5, and 6. The USB to eUSB logic may include an analog differential receiver, digital logic, and an analog single-ended transmitter. The translation from eUSB to USB is different than for USB to eUSB. There are two signals coupled with this logic, a driving_eusb_bus signal and a driving_usb_bus signal. The driving_eusb_bus signal is an indication from the USB to eUSB logic that it is processing a packet from the USB bus and passing it to the eUSB bus. When this is true, this causes the eUSB to USB logic using a pair of logic gates, for example AND gates 818, 828, to ignore the activity it sees on the eUSB bus. The driving_usb_bus signal is an indication to the USB to eUSB logic that a packet is being passed from the eUSB bus to the USB bus and so the USB to eUSB logic 814 should not act on USB bus activity The analog single-ended receiver 802 has an eD+ output driver 824 that is coupled to the eD+ input port 803 and an eD− output driver 826 that is coupled to the eD− input port 805. The eD+ output driver 824 and the eD− output driver 826 are connected to the logic core 820 through respective input AND gates 818, 828. The input AND gates are both coupled to the driving_eusb_bus signal from the USB to eUSB logic 814. When the driving_eusb_bus signal goes high, its inverse is coupled to each input AND gate to close the input AND gates from forwarding the input signals.

The eD− input signal through the eD− output driver 826 coupled through AND gate 818 is labeled as the async_eusb_rxvalid signal. It asserts high upon the first "K" of the SYNC pattern of an FS packet on the eD− input port 805. The eD+ input signal through the output driver 824 coupled through AND gate 828 is labeled as the async_eusb_eop signal. It asserts high upon the start and end of SE0 of the EOP on the eUSB bus. The first rising edge of SE0 on the eUSB bus and particularly the eD+ input port 805 corresponds to driving SE0 on the USB bus. The second rising edge corresponds to SE0 being deasserted and driving a "J" on the USB bus. The subsequent falling edge on eD+ causes the analog differential transmitter to tristate the USB output at the differential output ports 807, 809.

The signal at the eD− input port is labeled as the ana_eusb_rx_dm signal and is also coupled to an inverter 827. The inverted result is labeled as the async_usb_txdata_rep signal and is coupled to the analog differential transmitter 804 as the usb_tx_data signal. The usb_tx_data signal is used as the internal data signal to the analog differential transmitter 804. In the illustrated example it may be a single-ended data signal on a single-ended data line. The line from the inverter 827 to the transmitter output driver 830 is an internal data line.

An SE1 detection circuit 816 is coupled to both the eD+ and eD− input ports 803, 805 to generate a signal when a valid SE0 is detected on the line. The output of the SE1 detection circuit 816 is labeled as the ana_eusb_rx_se1 signal. The SE1 detection circuit 816 checks the skew between the eD+ and eD− inputs for a valid SE1 before asserting its output, the ana_eusb_rx_se1 signal. The skew between the eD+ and eD− lines may entail one of the lines going high before the other one at the start of the SE1 or one of the lines going low before the other one at the end of the SE1. An SE1 extension circuit 822 simply extends the SE1 status for use by the logic core 820. An SE1 condition on the eUSB bus indicates port resets and the start of control messages. The SE1 extension circuit 822 generates an eusb_rxse1_extended signal to the logic core 820 when SE1 is detected.

The SE1 extension circuit 822 uses an SE1 flip-flop 850 and a logic gate, for example an OR gate 851. The SE1 detection circuit 816 passes the detected SE1 signal, labeled the ana_eusb_rx_se1 signal, through the OR gate 851 to the logic core 820. In addition, the ana_eusb_rx_se1 signal is applied to the SE1 flip-flop 850 which also receives a system clock, the sys_clk signal, from the high level logic 808 to extend the SE1 signal which is then labeled as the eusb_rxse1_extended signal. A simpler but less accurate result may also be achieved using a delay cell. Different clock frequencies may be used for the sys_clk signal. In embodiments, a single clock period is longer than the maximum time of the skew on eD+ and eD− according to the eUSB specification.

When an eUSB packet starts, the single-ended signaling on eD−, in FS mode, or eD+ in LS mode is passed through to the USB side and driven to USB as a differential signal with the correct polarity. For example, an incoming K on eUSB for FS mode is where eD− is high. This passes through to USB as a differential K where D− is high and D+ is low. For example, an incoming K on eUSB for LS mode is where eD+ is high. This should pass through to USB as a differential K where D+ is high and D− is low.

For the single-ended receiver an eUSB end of packet (EOP)) is signaled using two high going pulses on eD+ for FS mode or on eD− for LS mode. For both FS and LS mode, on the first rising edge of the EOP, the USB bus may be driven to SE0 (both D+ and D− lines low. This can be seen in the signal timing diagram of FIG. 3. On the second rising edge of the EOP, the USB bus should be driven to the J state (D+ high and D− low for FS mode; D+ low and D− high for LS mode.

The packet data on the eUSB data line, the usb_tx_data signal, from the analog single-ended receiver 802 is passed through the analog differential transmitter 804 as a USB differential signal with the correct polarity. The analog differential transmitter 804 has transmitter output driver 830 which may be in the form of a digital transistor output driver configured to convert the voltage of the single-ended data signal to the higher voltage of a differential data bus. The transmitter output driver drives a differential signal from a positive output coupled to the D+ output port 807 and an inverted output coupled to the D− output port 809. It operates in Full Speed (FS) and Low Speed (LS) modes. In an embodiment, the transmitter output driver 830 is configured so that a "1" from the internal data signal, the usb_tx_data signal, at its data input generates a USB D+ high at the D+ output port 807 and USB D− low at the D− output port 809. For FS this is a J and for LS this is a K.

Accordingly, when eD− goes high (K) at the start of a packet start during FS mode, the data to the transmitter output driver 830 is 0. This is conveyed on the differential USB signaling as USB D− high and D+ low. As a result, the eUSB data line from the eD− output driver 826, the ana_eusb_lsrsrx_dm signal is inverted at an inverter 827 and the internal data signal is then connected on the internal data line as the usb_tx_data signal to the data input of the transmitter output driver 830. When the eUSB data line, the usb_tx_data signal, goes high (K) at the start of the packet during LS mode, the data to the transmitter output driver 830 is "1" to drive USB D+ high and D− low. As a result, in the LS case there is no inversion required. As shown, an fs_ls_mode signal is received from the high level logic 808 at the digital logic 806 which causes the digital logic 806 to adjust for the intended mode of operation. The mode may be determined in an initial setup or configuration operation.

In some embodiments, the USB differential driver, the transmitter output driver 830, is disabled on the last falling edge of the eUSB EOP. The USB bus will remain in the J state via the device pullup and host pulldown resistors 840, 842, 844 on the differential USB lines. The analog differential transmitter 804 has a switched pulldown resistor 840 for the D+ output port 807 and a switched pulldown resistor 842 for the D− output port 809. It also has a switched device pullup resistor 844 coupled to both the D+ output port 807 and the D-output port 809. The switching of the resistor is controlled by the high level logic 808. A usb_dp_pdn_en signal from the high level logic 808 operates a switch to connect the switched pulldown resistor 840 to the D+ output port 807. A usb_dm_pdn_en signal from the high level logic 808 operates a switch to connect the switched pulldown resistor 842 to the D− output port 809. A usb_dp_pup_en signal from the high level logic 808 operates a switch to connect the switched device pullup resistor 844 to the D+ output port 807. A usb_dm_pup_en signal from the high level logic 808 operates a switch to connect the same switched pulldown resistor 842 to the D− output port 809. A different configuration of switches and resistors may be used to suit different circumstances.

A keep alive from the eUSB bus is also translated to the USB bus. This has the same timing on eUSB as a normal packet EOP (described above) and results in the USB bus being driven to SE0 then data J then idle J as described above as well.

Figure 9:
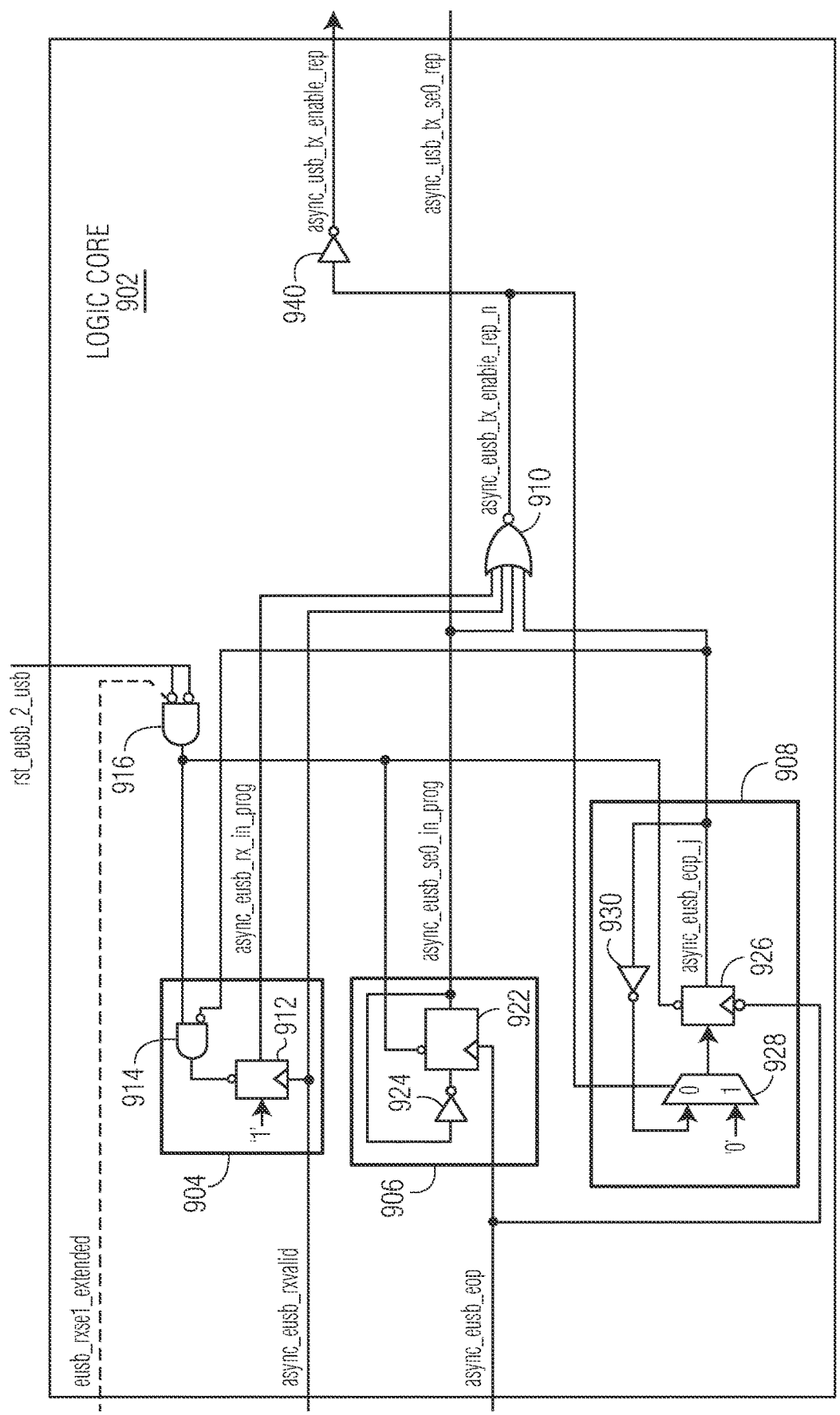
FIG. 9 is a block diagram of a logic core suitable for use as the logic core of the repeater for Low Speed (LS) mode and for Full Speed (FS) mode.

The block diagrams of FIGS. 8 and 9 will be used to describe translation from eUSB to USB in both FS mode and LS mode. In LS mode the opposite eUSB line is used for signaling. In eUSB the data line in FS mod, is eD− and for LS mode, it is eD+. The control line, which includes EOP signaling, in FS mode is eD+ and, for LS mode, it is eD−. For simplicity, the terms data line and control line will be used.

FIG. 9 is a block diagram of a logic core 902 suitable for use as the logic core 820 of the repeater 800 for Low Speed (LS) mode and for Full Speed (FS) mode. As described above, the analog single-ended receiver 802 in combination with the logic core 820 provide three signals as inputs to the logic core 902. These are labeled as the eusb_rxsel_extended signal, the async_eusb_rxvalid signal, and the async_eusb_eop signal. The logic core 902 provides two output signals to the analog differential transmitter 804. These are labeled as the async_usb_tx_enable_rep signal and the async_usb_tx_se0_rep signal. The logic core addresses packet start, packet end, control messages, higher level logic function reset, and failure handling. The data that from the internal data signal that is transmitted by the analog differential transmitter is sent on an internal data line outside of the logic core 902 as the usb_tx_data signal as shown in FIG. 8.

The logic core 902 also receives a rst_eusb_2_usb signal from the high level logic 808. This signal allows the high level logic 808 to reset a portion of the logic core 902 as needed. The reset may be to accommodate power on reset, non-repeating mode reset, reset during control message reception, etc. As in embodiments of FIG. 4, the rst_eusb_2_usb signal represents a reset signal from the high level logic 808 of the repeater 800. It may be asserted during power on conditions to reset the repeater to a known state. It may be asserted at various times during various other non-repeating modes as needed, for example to help create a clean transition from non-repeating to repeating mode. It may also be asserted during control messages to reset the invention so that it does not react to control message timing as a potential eUSB packet. It may also be used to reset the repeater during port reset conditions to reset the repeater to a known state The logic core has three flip-flops that are used to track the incoming eUSB packet and enable the eUSB data line to drive the analog differential transmitter 804. The first flip-flop is a transmit enable flip-flop 912 in a transmit enable circuit 904 and is a rising edge triggered flop that is triggered by the rising edge of the eUSB data line. It is set upon the start of the packet, for example the first SYNC bit, to enable the analog differential transmitter with a transmitter enable signal labeled the async_usb_tx_enable_rep signal. The second flip-flop is an EOP start flip-flop 922 in an EOP start circuit 906 and is a rising edge triggered flip-flop that uses the eUSB control line and is set at the start of the SE0 of the EOP (first rising edge of the control line) so that an SE0 can be forced onto the USB bus. It detects a first rising edge of the EOP signal which is the start of the EOP signal. It is cleared at the end of the SE0 of the EOP. This corresponds to the second rising edge of the control line. The third flip-flop is an EOP end flip-flop 926 in an EOP end circuit 908 and is a falling edge triggered flip-flop that uses the eUSB control line to track the end of the packet EOP. It detects a first falling edge of the EOP signal. The outputs from each of the flip-flops are sent to a logic gate, an enable gate 910 that controls the transmit enable signal the usb_tx_en signal shown in FIG. 8.

When the eUSB packet starts, the eUSB data line, including the async_eusb_rxvalid signal goes from low to high for the first SYNC bit of the packet. This signal is the data input to the transmit enable flip-flop 912 and will cause the clock input of the transmit enable flip-flop 912 to go high. This signal is labeled the async_eusb_rx_in_prog signal. When this goes high, the transmitter output driver 830 for the analog differential transmitter will be enabled for FS mode by the usb_tx_en signal. The async_eusb_rx_in_prog signal is coupled to an enable gate 910 in the form of a four-input logic gate, for example a NOR gate, which causes its output, labeled the async_usb_tx_enable_rep_n signal to go low. This signal is applied to an inverter to generate the async_usb_tx_enable_rep signal which goes high which is connected to the usb_tx_en signal at the enable port of the transmitter output driver 830 of the analog differential transmitter 804.

As described above, the packet data on the eUSB data line at the analog single-ended receiver 802 is carried through the digital logic 806 to the analog differential transmitter 804 and driven on to the USB differential bus with the correct polarity. At the end of the packet data, the EOP signal has 2 high going pulses on the eUSB control line. On the first rising edge of the EOP, the USB differential bus should be driven to SE0, indicated as both D+ and D− lines low.

The SE0 signal is carried as the async_eusb_eop signal which is connected to the data input of the EOP start flip-flop 922. This causes the clock input to go high to generate the async_eusb_se0_in_prog signal that is sent is sent as the asynch_usb_tx_se0_rep signal that becomes the usb_txse0 signal input to the transmitter output driver 830 which causes the transmitter output driver 830 to drive the USB bus to SE0. The async_eusb_se0_in_prog signal is also applied to an enable gate 910, in the form of a NOR gate, causing the enable gate 910 to go low and generate the async_usb_tx_enable_rep_n signal that is inverted to high at an inverter 940 and sent is sent as the asynch_usb_tx_enable_rep signal that becomes the enable signal to the transmitter output driver 830. Accordingly, the SE0 signal indicates the start of the EOP signal. The EOP start flip-flop detects a first rising edge of the EOP signal at the start of the EOP signal. It then sends an EOP start enable signal in the form of the async_eusb_rx_in_prog signal to a logic gate, the enable gate 910, in response. The async_eusb_rx_in_prog signal maintains the usb_tx_en transmitter enable signal.

On the first falling edge of the EOP, the EOP end flip-flop 926 will detect the first falling edge of the EOP signal and be set by receiving the async_eusb_eop signal at is data input. The EOP end flip-flop will then generate the async_eusb_eop_j signal at its clock input. This is applied to the enable gate 910 to generate another enable for the transmitter output driver 830. Applying the aysnc_eusb_eop_j signal is sending an EOP end enable signal to the logic gate. At this point the EOP start flip-flop 922 is still generating the async_eusb_se0_in_prog signal flop is still set indicating a continuing SE0 condition, and so the transmitter output driver 830 continues to drive SE0 onto the USB differential bus. The async_eusb_eop_j signal is also coupled through a second AND gate 914 of the transmit enable circuit 904 to the clear input of the transmit enable flip-flop 912. The transmit enable flip-flop 912 is cleared to indicate that the packet data portion of the packet is complete. This will remove one of the enable sources at the enable gate 910 for the transmitter output driver 830. The async_eusb_se0_in_prog signal and the async_eusb_eop_j signals are still asserted providing enable signals.

On the second rising edge of the EOP, the USB bus is driven to the J state, indicated as D+ high and D− low for FS mode and D+ low and D− high for LS mode. The EOP start flip-flop 922 is cleared. This disables the assertion of the async_usb_tx_se0_rep signal from the clock gate of the EOP start flip-flop 922. In response to this signal being disabled, the transmitter output driver 830 will fall back to its data input, the usb_tx_data signal, which will be "1" in the case of FS mode, in which eD− is low and then inverted, or "0" in the case of LS mode in which eD+ is low and not inverted. The USB differential bus is driven with a differential "J" state in each mode.

Considering the enable gate 910, on the second rising edge of the EOP, there is only one enable that is asserted at the transmitter output driver 830. That signal is the async_eusb_eop_j signal. The asynch_eusb_se0_in_prog signal has just been de-asserted in response to the second rising edge. The async_eusb_rxvalid signal has been de-asserted as described above and the async_eusb_rx_in_prog signal has been de-asserted at the end of the packet data.

On the last falling edge of the EOP, the transmitter output driver 830 to the USB bus is no longer enabled so that the USB bus will remain in the "J" state via the switched device pullup resistors 844 and host pulldown resistors 842. This happens when the EOP end flip-flop 926 is cleared by an inversion on its data input, an inversion of the async_eusb_eop_j signal. This clears the output async_eusb_eop_j signal, which was the only enable input to the enable gate 910. The transmitter output driver 830 stops driving the USB bus so that the bus will remain in its J state via the switched device pullup resistors 844 and host pulldown resistors 842. The EOP end flip-flop 926 detects the last falling edge of the EOP signal and removes an EOP end circuit enable signal to the enable gate 910. This disables the enable output of the enable gate 910.

Keep alive signaling is defined in both eUSB and USB and so a keep alive signal is passed, in translation mode, from the eUSB bus to the USB bus. On the eUSB bus, the keep alive signal has the same timing as a data packet EOP so that, as with a data packet EOP, the USB bus is driven to SE0 then data J then idle J as described above for a data packet EOP.

The design must detect an SE1 condition on the eUSB bus in order to detect Port Resets and the start of control messages. The design must take into account the skew between the eD+ and eD− lines in order to not conclude that a new packet has started with one of the lines going high before the other one at the start of the SE1 or one of the lines going low before the other one at the end of the SE1

Figure 10:
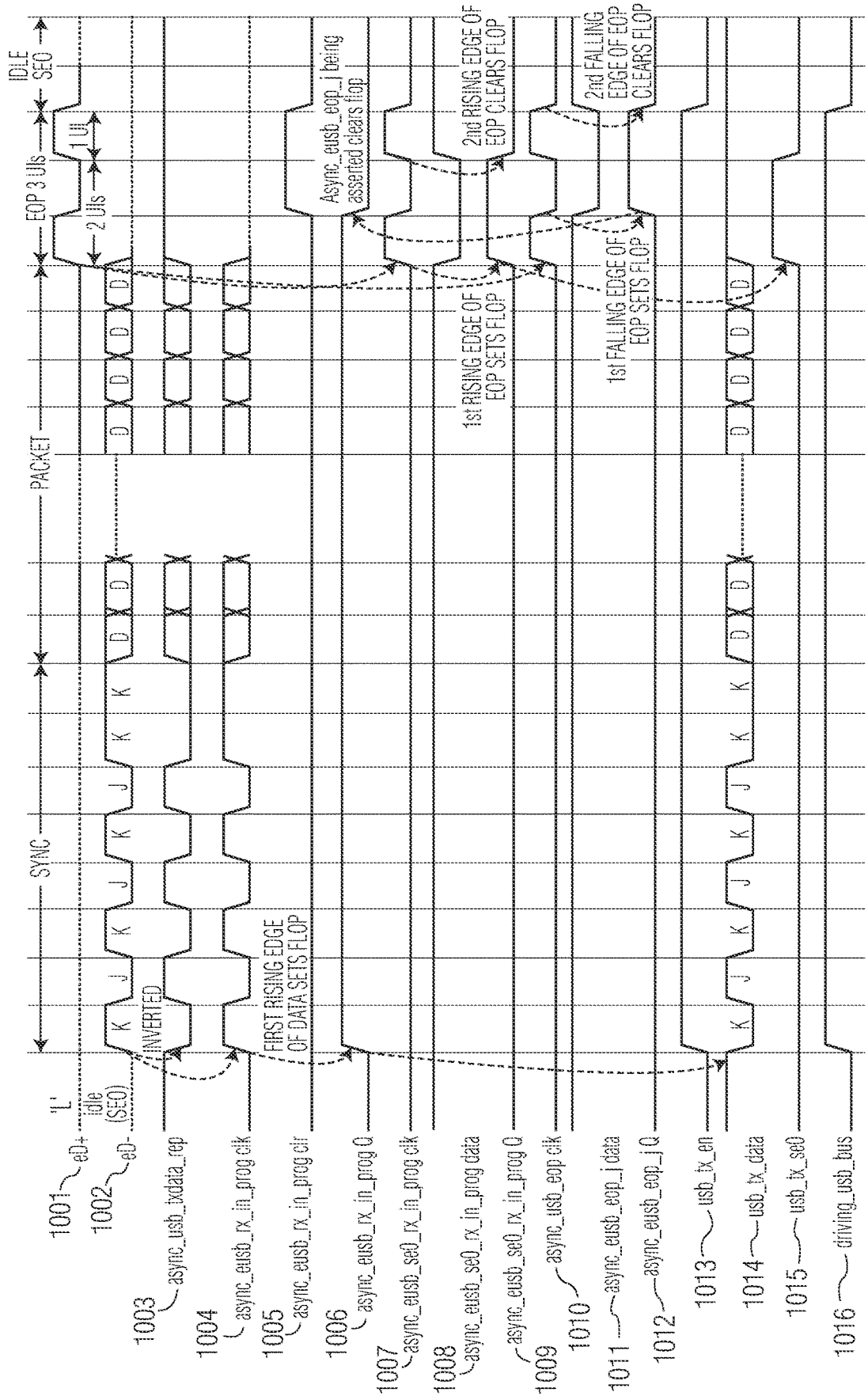
FIG. 10 is a signal timing diagram for the circuit for Full Speed mode described above with respect to FIGS. 8 and 9.

FIG. 10 is a signal timing diagram for the circuit for Full Speed mode described above with respect to FIGS. 8 and 9. The timing for Low Speed mode from eUSB to USB during transparent (repeating) mode is the same except that the eD+ output signal carries the data and the eD− output signal carries the EOP signaling.

Most of the signals in the timing diagram are indicated at locations on particular lines in FIGS. 8 and 9. In the timing diagram the signals are identified with reference numbers and may be described as follows:

1001 eD—This is the eUSB eD− input line received at the input port. It carries the SYNC and packet data in FS mode.

1002 eD+—This is the eUSB eD+ input line received at the input port. It is de-asserted until the EOP.

1003 async_usb_txdata_rep—In Full Speed mode this is the inverse of the eD− input and is coupled to the analog differential transmitter as the usb_tx_data signal. In Low Speed mode, this is the non inverse of the eD+ input and is also coupled to the analog differential transmitter as the usb_tx_data signal. In FS mode an eUSB "J" is represented as a "1" on this signal and a "K" is represented as a "0." In contrast, in LS mode an eUSB "J" is represented as "0" on this signal and a "K" is represented as a "1."

1004 async_usb_rx_in_prog clk—This is the clock input to the transmit enable flip-flop 912. It is activated on the first rising or falling edge of the data on eD+ or eD−, respectively.

1005 async_eusb_rx_in_prog clr—This is the clear signal to the transmit enable flip-flop 912. It is asserted when the async_eusb_eop_j signal is asserted to clear the transmit enable flip-flop 912.

1006 async_eusb_rx_in_prog Q—This is the Q input to the transmit enable flip-flop 912. It is asserted on the first transition of the data and then de-asserted with the first falling edge of the EOP.

1007 async_eusb_se0_rx_in_prog clk—This is the clock input to the EOP start flip-flop 922 and is started on the first rising edge of the packet EOP.

1008 async_eusb_se0_rx_in_prog data—This is the data output of the EOP start flip-flop 922. It is asserted at the first rising edge of the EOP and cleared on the second rising edge of the EOP.

1009 async_eusb_se0_rx_in_prog Q—This is the Q input to the EOP start flip-flop 922 and is the inverse of the corresponding data output.

1010 async_usb_eop clk—This is the clock input to the EOP end flip-flop 926. It begins at the first rising edge of the EOP and counts until the second falling of the EOP.

1011 async_usb_eop_j data—This is the data output of the EOP end flip-flop 926. It is high until the first falling edge of the EOP and then transition back to high on the second falling edge of the EOP.

1012 async_usb_eop_j Q—This is the Q input to the EOP end flip-flop 926 and is the inverse of the data output.

1013 usb_tx_enable—This is the enable for the transmitter output driver 830 that drives the D+/D− differential output signal of the analog differential transmitter. It is asserted on the first rising edge of the data and de-asserted at the second falling edge of the EOP.

1014 usb_tx_data—This is the same as the async_usb_txdata_rep signal and a first input to the transmitter output driver 830.

1015 usb_tx_se0—This is the same as the async_usb_tx_se0_rep signal and is the second input to the transmitter output driver. It is asserted on the first edge of the EOP to stop data transmission during EOP. It is low until the EOP.

1016 driving_usb_bus—This is a signal sent to the USB to eUSB logic 814 during the packet data and the EOP to indicate that the eUSB to USB logic is driving the USB bus and that any signal detected on the USB bus are not received data but transmitted data.

Figure 11:
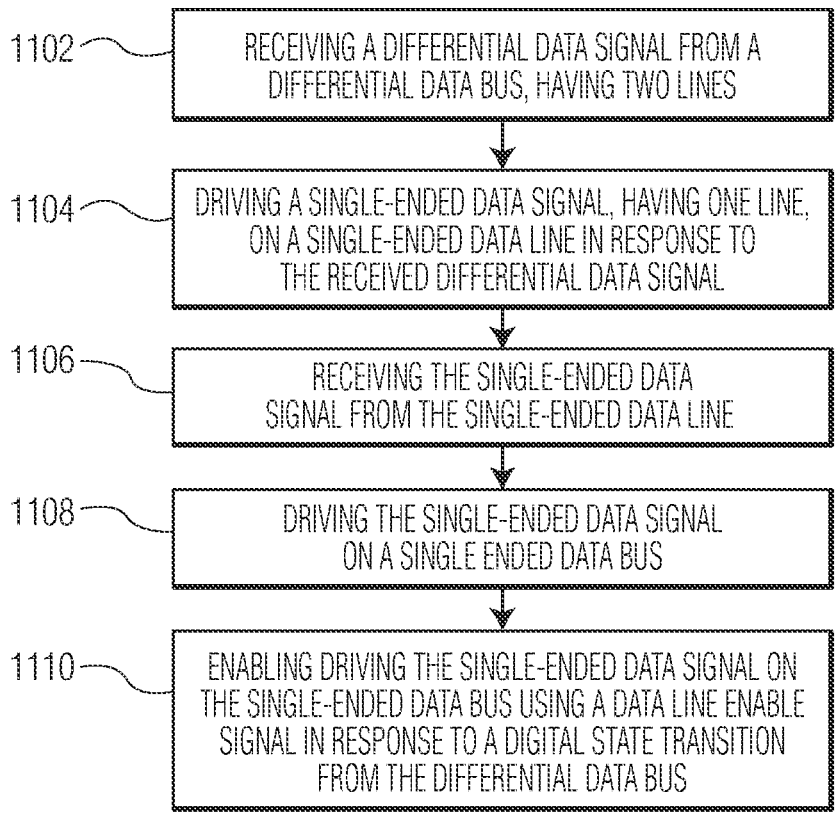
FIG. 11 is a process flow diagram of the operation of a USB to eUSB repeater as shown and described above.

FIG. 11 is a process flow diagram of the operation of a USB to eUSB repeater having a simple physical structure as shown and described above. In particular the method may be performed by a differential to single-ended signal repeater. The process begins at 1102 with receiving a differential data signal from a differential data bus, having two lines. In embodiments, an analog differential receiver receives the differential data signal at a receiver output driver. The receiver output driver may be in the form of a digital transistor output driver configured to convert the voltage of the differential data signal to a lower voltage for the single-ended data signal. The differential data signal may be presented on a D+ and a D− line and may begin with SYNC bits and then packet data.

At 1104 the process continues with driving an internal data signal, in some cases a single-ended data signal, having one line, on an internal data line, in some cases single-ended data line in response to the received differential data signal. In embodiments, the receiver output driver drives the single-ended data signal from the receiver output driver in response to the received differential data signal through to an eUSB data line.

At 1106 the process continues with receiving the internal data signal from the internal data line, for example the eUSB data line. In embodiments, an analog single-ended transmitter receives the internal data signal from the internal data line at a transmitter output driver.

At 1108 the process continues with driving the single-ended data signal on a single-ended data bus. In embodiments, the transmitter output driver is coupled to eD+ or eD− of the single-ended data bus.

At 1110 the process includes enabling driving the single-ended data signal on the single-ended data bus using a data line enable signal in response to a digital state transition from the differential data bus. The digital state transition may be in a SYNC sequence or a packet data sequence. In embodiments the enable signal is generated by a stable logic circuit or an enable control circuit and the process includes maintaining the enable signal until the stable logic circuit receives a reset signal.

In some embodiments EOP signals are also received including EOP start and EOP end signal. The process includes disabling the data line enable signal in response to EOP signals.

Figure 12:
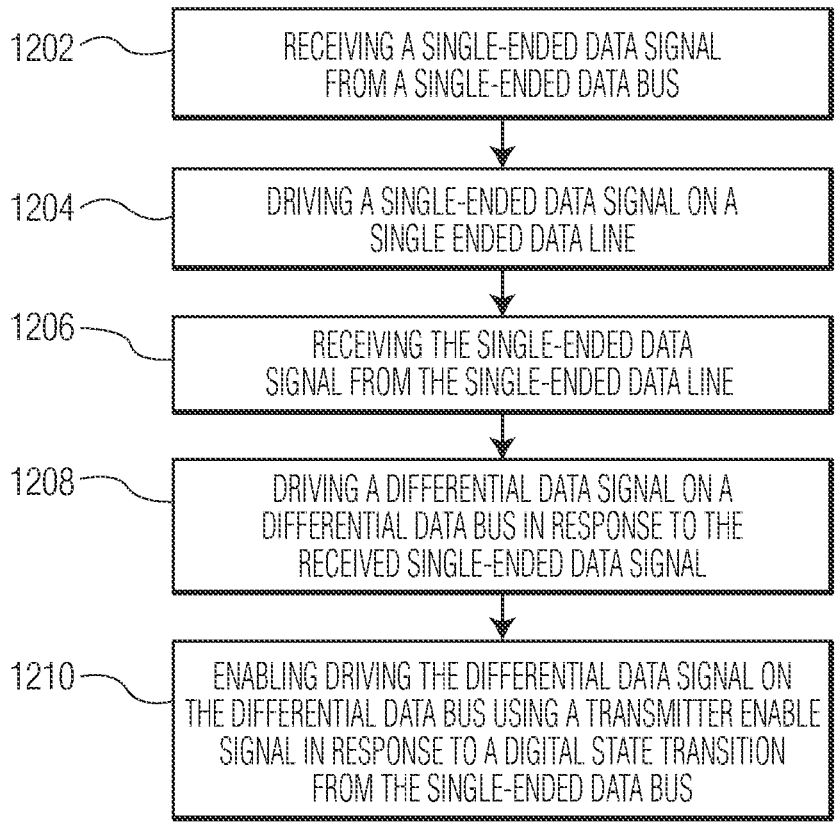
FIG. 12 is a process flow diagram of the operation of an eUSB to USB repeater as shown and described above.

FIG. 12 is a process flow diagram of the operation of an eUSB to USB repeater having a simple physical structure as shown and described above. In particular the method may be performed by a single-ended to differential signal repeater. The process begins at 1202 with receiving a single-ended data signal from a single-ended data bus. In some embodiments an analog single-ended receiver is configured to receive a single-ended data signal from a single-ended data bus at a receiver output driver.

At 1204 the process continues with driving an internal data signal on a internal data line. In some embodiments, the internal data signal is driven onto the internal data line by the receiver output driver.

At 1206 the process continues with receiving the internal data signal from the internal data line. In some embodiments, an analog differential transmitter is configured to receive the internal data signal from the internal data line, at a transmitter output driver.

At 1208 the process continues with driving a differential data signal on a differential data bus in response to the received single-ended data signal. In some embodiments the analog differential transmitter is configured to drive a differential data signal on a differential data bus having two lines from the transmitter output driver in response to the received single-ended data signal.

At 1210 the process includes enabling driving the differential data signal on the differential data bus using a transmitter enable signal in response to a digital state transition from the single-ended data bus. The digital state transition may be in a SYNC sequence or a packet data sequence. In embodiments the enable signal is generated by a stable logic circuit or an enable control circuit and the process includes maintaining the enable signal until the stable logic circuit receives a reset signal.

Figure 14:
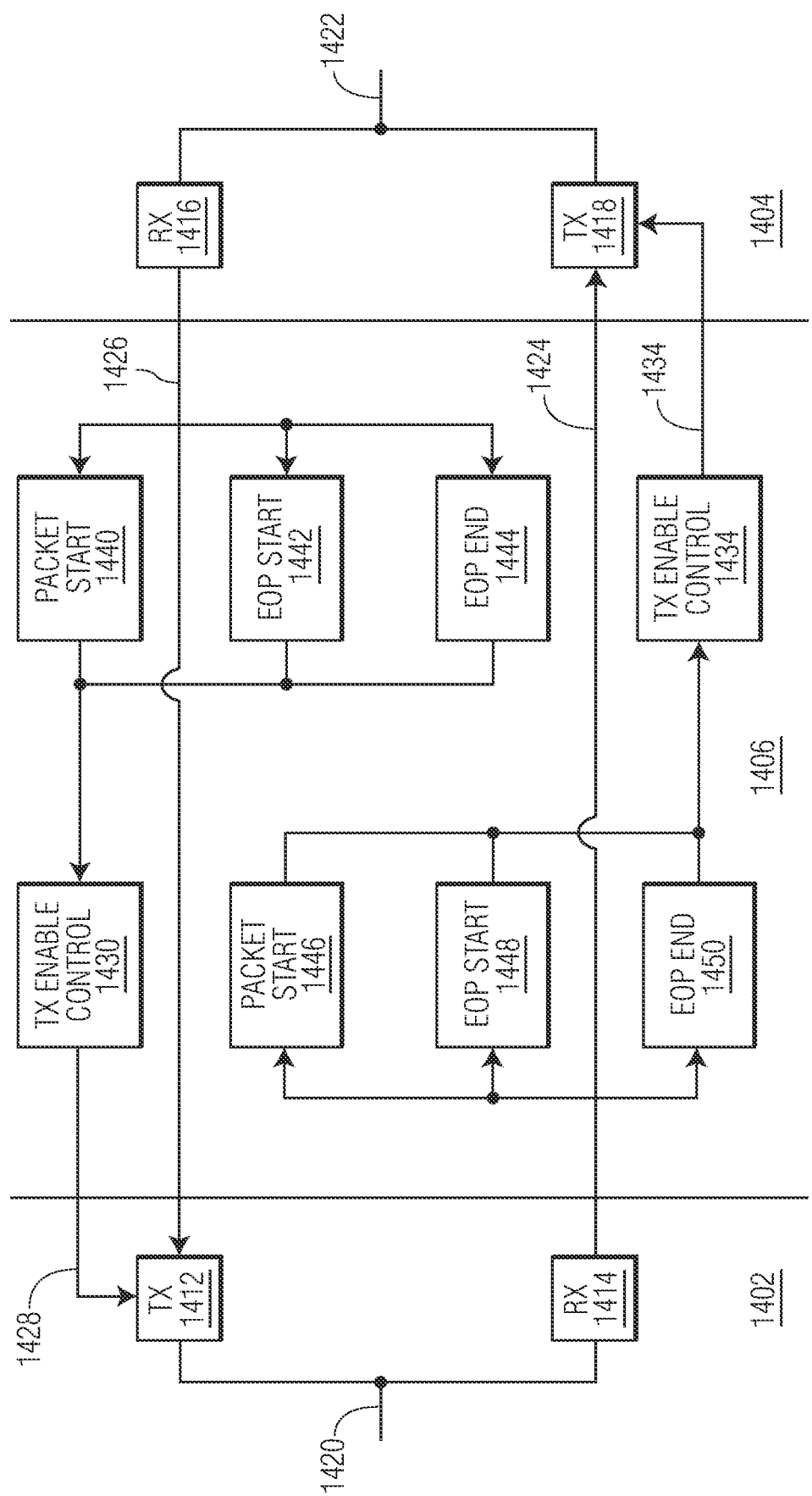
FIG. 14 is a simplified diagram of an eUSB repeater that may include some or all of the components described above.

FIG. 14 is a simplified diagram of an eUSB repeater that may include some or all of the components described above. The eUSB repeater 1400 comprises an eUSB transceiver 1402 coupled to an eUSB bus 1420, a USB transceiver 1404 coupled to a USB bus 1422, and repeater logic 1406 coupled to and between the eUSB transceiver 1402 and the USB transceiver 1404. The eUSB bus 1420 may be in accordance with the eUSB2 Specification or any other specification or for any other suitable single-ended bus. The USB bus 1422 may be in accordance with a USB 1.0 (LS), USB 1.1 (FS), USB 2.0 (HS), USB 3.1 (SS), USB 3.x (SS and SSP), USB4 or any other specification or for any other suitable differential bus.

The eUSB transceiver 1402 includes an analog single-ended receiver 1414 configured to receive a single-ended data signal from the eUSB 1420, or any other suitable single-ended data bus, at a receiver output driver. The analog single-ended receiver is also configured to drive an internal data signal from the receiver output driver on a internal data line 1424. The eUSB transceiver 1402 also includes an analog single-ended transmitter 1412 configured to receive an internal data signal from a internal data line 1426 at a transmitter output driver. The analog single-ended transmitter is also configured to drive the single-ended data signal from the transmitter output driver on the eUSB bus 1420.

The USB transceiver 1404 includes an analog differential receiver 1416 configured to receive a differential data signal from the USB 1422, or any other suitable differential data bus, in this case having two lines, at a receiver output driver. The analog differential receiver is further configured to drive an internal data signal, for example a single-ended data signal on an internal data line 1426 from the receiver output driver in response to the received differential data signal. The analog differential receiver also converts the voltage of the differential data bus to a lower voltage for the single-ended data signal. The USB transceiver 1404 also includes an analog differential transmitter 1418 configured to receive the single-ended data signal from the internal data line 1424, at a transmitter output driver. The analog differential transmitter 1418 is further configured to drive a differential data signal on the USB bus 1422 having two lines from the transmitter output driver in response to the received single-ended data signal. The transmitter output driver is configured to convert the voltage of the single-ended data signal to a higher voltage for the differential data signal on the differential data bus. The differential data signal has a first output and a second inverted output The analog single ended transmitter 1412 is controlled by a data line enable signal received on a first enable line 1428 and driven by a first enable control circuit 1430. The first enable control circuit receives a digital state transition from the differential data bus and generates the data line enable signal in response. In a similar way, the analog differential transmitter 1418 is controlled by a data line enable signal received on a second enable line 1432 from a second enable control circuit 1434. The second enable control circuit receives a digital state transition from the single-ended data bus and generates the data line enable signal in response. The enable control circuits 1430, 1434 include a stable logic circuit, for example a flip-flop or sequence of delay gates that are configured to maintain the data line enable signal until receiving a reset signal.

The first enable control circuit 1430 is coupled to a packet sync start circuit 1440 that is coupled to the internal data line 1426 from the analog differential receiver 1416 and that is configured to detect the digital state transition on the internal data line 1426. The packet sync start detect circuit 1440 determines whether the state transition is the start of a new packet and then provides an indication to the first enable control circuit 1430 to generate the data line enable signal the enable gate of the analog single-ended transmitter 1412, for example at an output driver to provide the transmitter enable signal to the transmitter output driver.

The first enable control circuit 1430 is also coupled to an EOP start circuit 1442 coupled to the internal data line 1426 to receive the single-ended data signal and to detect a start of an EOP signal at the EOP start circuit 1442. The EOP start circuit is coupled to the enable gate of the analog single-ended transmitter 1412 through the first enable control circuit and configured to maintain the transmitter enable signal to the analog single-ended transmitter 1412 in response to the start of the EOP signal. When a stable logic circuit is used at the first enable control circuit 1430 then the EOP start circuit 1442 may be coupled to a reset port of the stable logic circuit to provide a reset signal to the stable logic circuit. The first enable control circuit 1430 is also coupled to an EOP end circuit 1444 that is configured to detect an end of an EOP signal. The EOP end circuit 1444 is coupled to the enable control circuit 1430 and configured to disable the transmitter enable signal at the enable control circuit 1430 in response to the end of the EOP signal.

In a similar way, the second enable control circuit 1434 is also coupled to a packet sync start circuit 1446, an EOP start circuit 1448, and an EOP end circuit 1450 each of which are coupled to the internal data line 1424 from the analog single-ended receiver 1414 and configured to detect a packet start, an EOP start, and an EOP end, respectively. The enable control circuit 1434 receives the signals from each circuit and generates or disables an enable signal on the second enable line 1432 to the analog differential transmitter 1419. The signals generated on the differential data bus and on the single-ended data bus to drive both lines low, to tristate a line, and to pull down a line are described in more detail above.

In some embodiments, an EOP start circuit is coupled to the single-ended data bus and to the enable gate and is configured to detect a first rising edge of an EOP signal and to send an EOP start circuit enable signal to the enable gate in response thereto. An EOP end circuit is coupled to the single-ended data bus and to the enable gate and is configured to detect a last falling edge of the EOP signal and to remove an EOP end circuit enable signal to the enable gate so that the transmitter output driver is not enabled.

In the following description and claims, the term "coupled" along with its derivatives, may be used. "Coupled" is used to indicate that two or more elements have a connection that permits interaction but that there may be intervening physical or electrical components between them. "Electrically coupled" is used to indicate that the interaction is electrical as compared to physical, magnetic, or another form of interaction. As used in the claims, unless otherwise specified, the use of the ordinal adjectives "first," "second," "third," etc., to describe a common element, merely indicate that different instances of like elements are being referred to, and are not intended to imply that the elements so described must be in a given sequence, either temporally, spatially, in ranking, or in any other manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A differential to single-ended signal repeater comprising:
   wherein the repeater is a USB compliant repeater configured to operate in a repeating mode;
   an analog differential receiver configured to operate in the repeating mode and receive a differential data signal from a USB compliant differential data bus, having two lines, at a receiver output driver and configured to drive an internal data signal on an internal data line from the receiver output driver in response to the received differential data signal;
   an analog single-ended transmitter configured to operate in the repeating mode and receive the internal data signal from the internal data line at a transmitter output driver and configured to drive the single-ended data signal from the transmitter output driver on a USB compliant single-ended data bus; and
   an enable control circuit configured to enable the analog single-ended transmitter using a data line enable signal, the enable control circuit receiving a digital state transition from the differential data bus and generating the data line enable signal in response thereto;
   wherein the enable control circuit includes an enable flip-flop configured to generate the data line enable signal in response to a start of receiving a Full Speed packet on the differential data bus.

2. The repeater of claim 1, wherein the enable control circuit comprises a stable logic circuit configured to maintain the data line enable signal until receiving a reset signal.

3. The repeater of claim 1, further comprising an input filter circuit configured to receive the differential data signal, configured to detect an end of packet (EOP) signal at the input filter circuit, and configured to disable the data line enable signal at the enable control circuit in response to the EOP signal.

4. The repeater of claim 3, wherein the enable control circuit comprises a stable logic circuit configured to maintain the data line enable signal until receiving a reset signal and wherein the input filter circuit is coupled to a reset port of the stable logic circuit to provide the reset signal to the stable logic circuit.

5. The repeater of claim 3, further comprising switched pulldown resistors coupled to the input filter circuit and configured to be coupled to the singled-ended data line when the data line enable signal of the input filter circuit is disabled.

6. The repeater of claim 3, wherein the EOP signal comprises a state in which the differential data bus has a low state on both lines for more than a specific delay, wherein the input filter circuit comprises a logic gate with an output coupled to the enable control circuit, and wherein the logic gate disables the data line enable signal after receiving the EOP signal for more than the specific delay.

7. The repeater of claim 3, wherein the EOP signal includes a single-ended zero (SE0) signal.

8. The repeater of claim 1:
   wherein the USB compliant differential data bus is a USB2 compliant differential data bus; and
   wherein the USB compliant single-ended data bus is an eUSB compliant single-ended data bus.

9. The repeater of claim 1, wherein the enable control circuit includes:
   an input filter circuit configured to reset the enable flip-flop when the Full Speed packet ends on the differential data bus.

10. The repeater of claim 1:
    wherein the repeater includes a control line; and
    wherein the enable control circuit includes,
       a delay cell configured to transmits a control line enable signal for a predetermined delay interval after the repeater stops sending the single-ended data signal from the transmitter output driver on the USB compliant single-ended data bus.

11. A method for repeating a USB compliant signal, comprising:
    receiving, while operating in a repeating mode, a differential data signal from a USB compliant differential data bus, having two lines;
    driving an internal data signal on an internal data line in response to the received differential data signal;
    receiving the internal data signal from the internal data line;
    driving, while operating in the repeating mode, the single-ended data signal on a USB compliant single ended data bus; and
    enabling driving the single-ended data signal on the single-ended data bus using a data line enable signal in response to a digital state transition from the differential data bus;
    using an enable flip-flop to generate the data line enable signal in response to a start of receiving a Full Speed packet on the differential data bus.

12. The method of claim 11, further comprising:
    detecting an EOP signal and disabling the data line enable signal in response to the EOP signal after a delay after an SE0 condition ends on the differential data signal.

13. The method of claim 12, further comprising delaying the single-ended data signal based on the delay after the SE0 condition ends.

14. A single-ended to differential signal repeater comprising;
    wherein the repeater is a USB compliant repeater configured to operate in a repeating mode;
    an analog single-ended receiver configured to operate in the repeating mode and receive a single-ended data signal from a USB compliant single-ended data bus at a receiver output driver and configured to drive an internal data signal from the receiver output driver on an internal data line;
    an analog differential transmitter configured to operate in the repeating mode and receive the internal data signal from the internal data line, at a transmitter output driver and configured to drive a differential data signal on a USB compliant differential data bus having two lines from the transmitter output driver in response to the received single-ended data signal; and
    an enable control circuit configured to enable the analog differential transmitter using a transmitter enable signal, the enable control circuit receiving a digital state transition from the single-ended data bus and generating the transmitter enable signal in response thereto;
    wherein the enable control circuit includes an enable flip-flop configured to generate the data line enable signal in response to a start of receiving a Full Speed packet on the differential data bus.

15. The repeater of claim 14, wherein the enable control circuit comprises a stable logic circuit configured to maintain the transmitter enable signal until receiving a reset signal.

16. The repeater of claim 14, further comprising:
an enable gate coupled to the enable control circuit and to the transmitter output driver to provide the transmitter enable signal to the transmitter output driver; and
an end of packet (EOP) start circuit coupled to the single-ended data bus configured to receive the single-ended data signal and configured to detect a start of an EOP signal at the EOP start circuit,
the EOP start circuit being coupled to the enable gate and configured to maintain the transmitter enable signal to the transmitter output driver in response to the start of the EOP signal.

17. The repeater of claim 16, wherein the enable control circuit comprises a stable logic circuit configured to maintain the transmitter enable signal until receiving a reset signal and wherein the EOP start circuit is coupled to a reset port of the stable logic circuit configured to provide the reset signal to the stable logic circuit.

18. The repeater of claim 16, wherein the EOP start circuit is coupled to the analog differential transmitter to send an EOP signal to cause the transmitter output driver to drive the two lines of the differential data bus low.

19. The repeater of claim 16, further comprising an EOP end circuit configured to detect an end of an EOP signal at the EOP end circuit, the EOP end circuit being coupled to the enable control circuit and configured to disable the transmitter enable signal at the enable control circuit in response to the end of the EOP signal such that the transmitter output driver is disabled.

20. The repeater of claim 14, wherein the transmitter output driver comprises a digital transistor output driver configured to convert a voltage of the differential data signal to a higher voltage for the differential data signal and having a first output and a second inverted output.

21. The repeater of claim 16, wherein the EOP start circuit is further configured to detect a first rising edge of an EOP signal as the start of the EOP signal.

22. The repeater of claim 19, wherein the EOP end circuit is further configured to detect a last falling edge of the EOP signal as the end of the EOP signal and to disable the transmitter enable signal by removing the EOP end circuit enable signal to the logic gate so that the transmitter enable signal is disabled.

23. The repeater of claim 22, wherein the EOP end circuit is further configured to detect a first falling edge of the EOP signal and to send an EOP end enable signal to the logic gate and remove the EOP start enable signal.

* * * * *